United States Patent
Newman

(10) Patent No.: US 10,551,513 B1
(45) Date of Patent: *Feb. 4, 2020

(54) CYLINDRICAL DIRECTIONAL DETECTOR WITHOUT COLLIMATOR

(71) Applicant: David Edward Newman, Poway, CA (US)

(72) Inventor: David Edward Newman, Poway, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/293,919

(22) Filed: Mar. 6, 2019

Related U.S. Application Data

(63) Continuation of application No. 16/221,439, filed on Dec. 14, 2018, now Pat. No. 10,261,200.

(60) Provisional application No. 62/760,008, filed on Nov. 12, 2018.

(51) Int. Cl.
*G01T 1/20* (2006.01)
*G01T 1/29* (2006.01)
*G01T 3/06* (2006.01)
*G01T 3/08* (2006.01)

(52) U.S. Cl.
CPC .............. *G01T 1/2907* (2013.01); *G01T 1/20* (2013.01); *G01T 1/29* (2013.01); *G01T 3/06* (2013.01); *G01T 3/08* (2013.01)

(58) Field of Classification Search
CPC ........... G01T 1/2907; G01T 3/08; G01T 1/18; G01T 1/20; G01T 1/29; G01T 3/06
See application file for complete search history.

(56) References Cited

U.S. PATENT DOCUMENTS

| | | | |
|---|---|---|---|
| 3,047,721 A | 9/1959 | Folsom | |
| 3,539,806 A * | 11/1970 | Humphrey | G01T 1/20 250/366 |
| 3,581,090 A | 5/1971 | Brown | |
| 5,345,084 A * | 9/1994 | Byrd | G01T 3/06 250/366 |
| 6,100,530 A | 8/2000 | Kronenberg | |
| 6,433,335 B1 | 8/2002 | Kronenberg | |
| 6,989,541 B2 * | 1/2006 | Penn | G01T 3/00 250/390.01 |
| 7,026,627 B2 | 4/2006 | Fowler | |
| 7,312,460 B2 * | 12/2007 | Gerl | G01T 1/169 250/393 |
| 7,470,909 B2 | 12/2008 | Larsson | |
| 7,595,494 B2 * | 9/2009 | Koltick | G01T 1/185 250/394 |
| 7,772,563 B2 | 8/2010 | LeGoaller | |
| 7,994,482 B2 | 8/2011 | Frank | |

(Continued)

*Primary Examiner* — Kiho Kim

(57) ABSTRACT

A device configured to detect particles from a radioactive source can localize the source in two dimension, such as the azimuthal and polar angles of the source. Embodiments of the device may comprise a hollow cylindrical or tubular array of "side" detector panels, plus a "central" detector positioned within the array, with no shield or collimator. The various side detector counting rates can indicate the azimuthal angle of the source, while the polar angle can be determined by a ratio of the side detector data divided by the central detector data. Embodiments of the directional detector device can provide greatly improved inspections, thereby detecting clandestine nuclear and radiological weapons, or other sources that are to be localized, rapidly and precisely.

19 Claims, 15 Drawing Sheets

(56) References Cited

U.S. PATENT DOCUMENTS

| | | | |
|---|---|---|---|
| 8,101,919 B2 | 1/2012 | Madden | |
| 8,198,600 B2 | 6/2012 | Neustadter | |
| 8,247,776 B2 | 8/2012 | Peng | |
| 8,299,441 B2 | 10/2012 | Gueorguiev | |
| 8,319,188 B2 | 11/2012 | Ramsden | |
| 8,829,443 B2 * | 9/2014 | Ryan | G01T 1/20 250/361 R |
| 9,759,823 B1 * | 9/2017 | Dowell | G01T 7/00 |
| 10,054,697 B1 | 10/2018 | Vancelj | |
| 2007/0152160 A1 | 7/2007 | Rowland | |
| 2008/0251728 A1 | 10/2008 | Madden | |
| 2011/0303854 A1 | 12/2011 | DeVito | |
| 2012/0138806 A1 * | 6/2012 | Holmes | G01T 1/20 250/369 |
| 2016/0306052 A1 | 10/2016 | Ramsden | |
| 2017/0261623 A1 | 9/2017 | Florido | |
| 2017/0363768 A1 | 12/2017 | Berheide | |

* cited by examiner

CYLINDRICAL DIRECTIONAL DETECTOR WITHOUT COLLIMATOR

CROSS REFERENCES TO RELATED APPLICATIONS

This application is a continuation of U.S. patent application Ser. No. 16/221,439 which claims the benefit of U.S. Provisional Patent Application No. 62/760,008 entitled "Two-Dimensional Directional Detector Without Shield" and filed on Nov. 12, 2018, the entire disclosures of which are incorporated herein by reference.

FIELD OF INVENTION

The invention relates to radiation detectors that indicate the direction of a radiation source in two dimensions.

BACKGROUND OF THE INVENTION

Clandestine nuclear weapons are an immediate worldwide threat. Rogue nations with nuclear weapons, or terrorist groups acquiring radiological material, could deliver it to a victim nation via commercial shipping. Advanced radiation detectors are necessary to reveal such weapons among shielding and clutter. An urgent national priority is the development of radiation detectors that detect shielded radioactive threats. In addition to detecting the presence of a threat source, it would be highly advantageous to also determine the location of the source. The location information would greatly improve the reliability of the detection, while greatly reducing false alarms. To be most effective, the detector should locate the source in two dimensions, such as horizontal and vertical angles or azimuthal and polar angles, relative to the detector.

An advanced gamma ray or neutron detector with two-dimensional directionality would be a huge advantage for safety and security applications, because it would greatly speed up the inspection process, would reveal hidden sources with higher sensitivity, and would enable rapid clearing of clean loads automatically. Even a shielded source would be revealed by particles coming from a particular spot on the cargo, as opposed to a broad background distribution. In this way, the two-dimensional localization greatly accelerates the scan and greatly amplifies the reliability of the alarm. In addition, the revealed location would provide a valuable starting point for the secondary inspection team. With such a detector, the entire inspection process could be speeded up, resulting in greatly reduced inspection times and reduced entry waits at shipping ports. And more importantly, it would detect a smuggled weapon.

What is needed, then, is an integrated radiation detector system with two-dimensional directionality. The detector should indicate, on a single measurement, the full two-dimensional source direction without rotations or iteration. Preferably such a detector would be compact, light-weight, fast, highly efficient, capable of high angular precision, and preferably with low cost.

SUMMARY

Disclosed herein is a directional detector device for detecting and locating a radioactive source. In one embodiment, the device includes an array of at least four side detectors, a central detector, and a processor. Each side detector may comprise a flat or arcuate form configured to emit a signal upon detecting a particle from the radioactive source. The side detectors may be arranged symmetrically around a detector axis that extends from the back to the front of the device. Each side detector may be proximate to, or substantially in contact with, two neighboring side detectors respectively, so that the side detector array thereby forms a substantially gapless hollow assembly.

The central detector may be configured to emit a signal upon detecting a particle from the radioactive source. The central detector may be centered on the detector axis, positioned at least partially within the side detector array, and protruding frontward beyond the side detector array.

The processor may comprise digital electronics configured to receive the signals from the side detectors and the central detector. The processor may also be configured to calculate the azimuthal angle of the radioactive source based at least in part on the side detector signals, and to calculate the polar angle of the radioactive source based at least in part on the central detector signals using a predetermined angular correlation function that relates the polar angle of the radioactive source to the central detector signals.

These and other embodiments are described in further detail with reference to the figures and accompanying detailed description as provided below.

DETAILED DESCRIPTION OF INVENTION

Disclosed herein is a directional radiation detector device (the "device") that detects gamma rays and/or neutrons (the "particles") from a radioactive source (the "source"), and determines the direction of the source in two dimensions, such as the azimuthal and polar angles of the source relative to the device. Importantly, embodiments of the device can determine the source direction from a single period of data acquisition at a single orientation of the device, without rotations or iteration.

An objective of the invention is to provide a two-dimensional directional detector that is high in detection efficiency yet low in weight, and which has sufficient detector area and sensitivity to rapidly detect and localize a clandestine source.

In some embodiments, the device comprises a hollow cylindrical or tubular array of at least four "side" detectors, a centrally positioned "central" detector (collectively, the "detectors"), and a processor, without a shield or collimator. The side detector array is "tubular" in that the array comprises a hollow, generally axially symmetric, assembly of side detectors in a substantially gapless elongate arrangement, positioned symmetrically around the detector axis. Each side detector is proximate to, or in contact with, or substantially in contact with, both adjacent side detectors, wherein "substantially in contact" means within 5-10 mm of each other, aside from necessary wrapping or mountings and the like. The detector axis is the symmetry axis of the side detector array, and also the symmetry axis of the central detector, and also the primary axis of the spherical coordinate system. Each side detector may have a flat slab-like shape or an arcuate cross-section, extruded in the back-to-front direction, and assembled as a hollow tube configuration around the detector axis. Each detector may be configured to emit a pulse or other signal upon detecting one of the particles, such as a light pulse or an electrical pulse. Transducers such as phototubes or amplifiers may be configured to convert the pulse into an electronic signal that can be analyzed by the processor. The processor may be configured to determine, from the signals, the presence of the source as well as the azimuthal and polar angles of the source.

In some embodiments, the processor may be configured to calculate the azimuthal angle of the source based on the side detectors, by interpolation or with a fitting routine for example. The processor may be further configured to determine the polar angle of the source by calculating a ratio of the side detector data divided by the central detector data, and then comparing that ratio to a predetermined angular correlation function that can provide, as output, an estimate of the polar angle.

Figure 1:
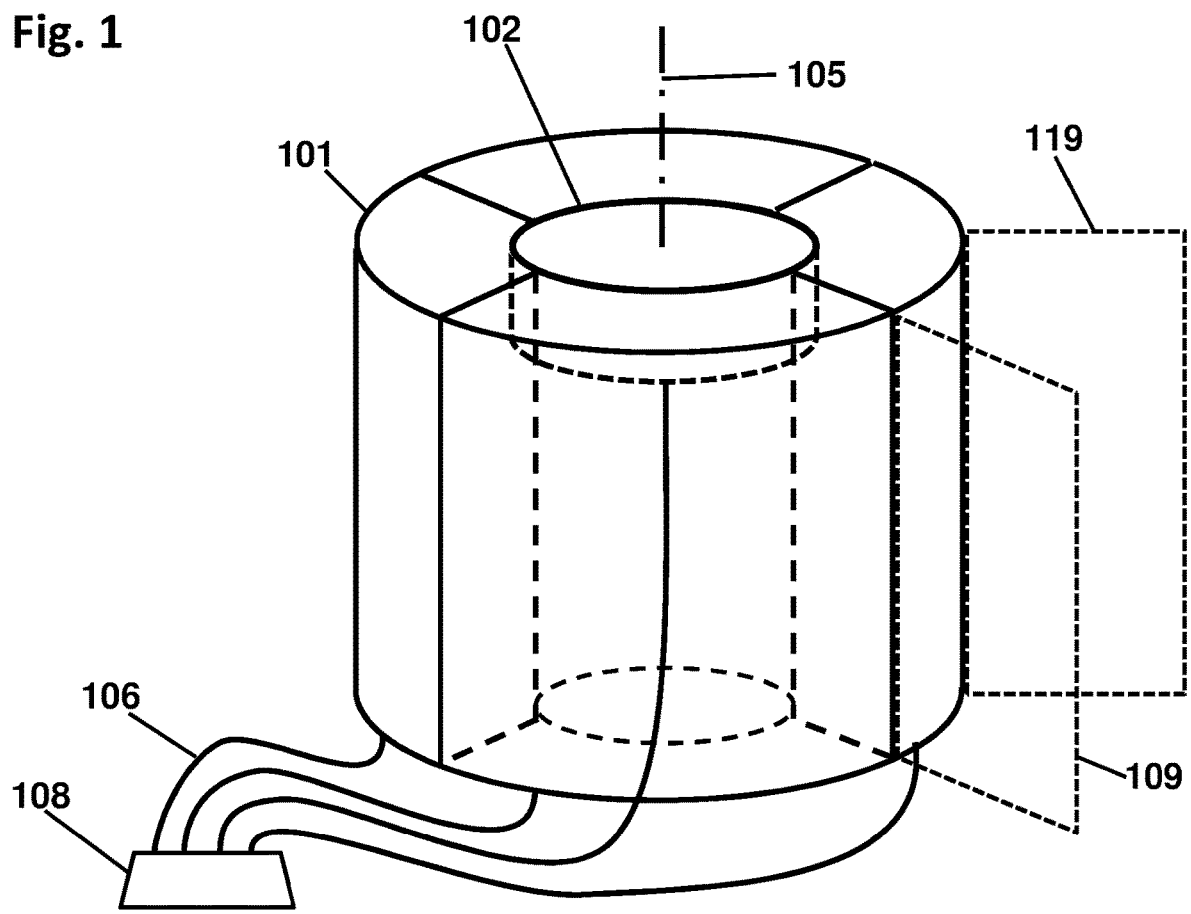
FIG. 1 is a perspective sketch depicting an exemplary device comprising a hollow cylindrical array of side detectors and a central detector, according to some embodiments.

FIG. 1 is a perspective sketch of an exemplary embodiment of a device according to some embodiments. Hidden lines are shown in dash. The device is facing upwards in the sketch. The device may comprise a cylindrical or tubular array of side detectors 101 coaxial with the detector axis 105, at least partially surrounding a central detector 102 that is at least partially within the side detector array 101. In some embodiments, there is no shield or collimator in the device. In the version shown, the front surface of the central detector 102 is flush or coplanar with the front of the side detector array 101. In other versions, the central detector 102 may be protruding frontward or recessed rearward relative to the front surface of the side detectors 101. Each side detector 101 may be substantially in contact with its two immediate neighbors, aside from necessary wrapping or mounting jigs. The side detectors 101 may thereby form a complete and substantially gapless hollow tubular shape. Each detector 101-102 may comprise any suitable detector type for detecting the particles, such as a scintillator, a semiconductor detector, a gaseous ionization detector, or any other type of detector that produces a signal upon detecting each particle.

Each detector 101-102 may be configured to detect source particles such as gamma rays, high-energy neutrons, or low-energy neutrons, or a combination thereof, or any other type of particle, and to emit a pulse or signal 106 which is conveyed to the processor 108.

In some embodiments, the processor 108 may comprise digital and/or analog electronics configured to acquire detection data of the detectors 101-102 and analyze the detection data to determine the source angles. The detection data may comprise electrical pulses, currents, voltages, or any other signaling means related to the detection of particles in the detectors 101-102. For example, the processor 108 may be configured to measure a counting rate for each detector 101-102, by counting the number of times each signal 106 exceeds a predetermined threshold during a time interval. The processor 108 may be configured to calculate the azimuthal angle of the source by interpolating among the side detectors 101, or by fitting the side detector counting rates to a source model, or otherwise combining the detection data of the side detectors 101. In some embodiments, the processor 108 may be configured to calculate a differential for each side detector 101, wherein each differential equals the difference between the counting rate for that side detector 101 minus the counting rate for the diametrically opposite side detector 101, respectively. The processor 108 may be configured to use those differentials in an interpolation or fitting analysis to determine the azimuthal angle of the source. If the number of side detectors 101 is odd, then each differential may equal the counting rate for one respective side detector 101 minus the average of the counting rates of the two opposing side detectors 101.

Also shown are two radial planes (dotted lines) at different azimuthal angles, the first plane 109 being aligned with an interface between two of the side detectors 101, and the second plane 119 being aligned with the centroid of one side detector 101. The planes 109-119 may be termed the "interface" and "centroid" planes respectively. In general, the angle between the interface and centroid planes 109-119 is 180/N, where N is the number of side detectors 101. Since the number of side detectors 101 in the figure is N=4, the two planes 109-119 are separated by 45 degrees azimuthally. These planes 109-119 may be useful for determining the polar angle while correcting certain anisotropies of the detectors 101-102, as explained below.

In some embodiments, the processor 108 may be configured to calculate the polar angle of the source by calculating a ratio R involving the central detector 102 and the side detectors 101, and to compare that ratio to a predetermined angular correlation function that provides, as output, an estimate of the polar angle of the source. The processor 108 may be configured to calculate R as a numerator value V according to the side detector 101 data, divided by a denominator value D according to the central detector 102 data, and then to provide R to the predetermined angular correlation function which then determines the polar angle. The predetermined angular correlation function may comprise a table of values relating R to the polar angle, or an analytic function, or a computer routine, or a mathematical algorithm, or any other data set that relates the polar angle of the source to the detection data.

In a first version of the device, the processor 108 may be configured to calculate V as the highest counting rate of the side detectors 101, and to calculate D as the counting rate of the central detector 102. The processor 108 may be configured to then calculate R=V/D and to compare R to the predetermined angular correlation function that thereby provides an estimate of the polar angle of the source. The polar angle determined in this way is generally accurate to a few degrees or less throughout the range of 0-360 degrees azimuthal and 0-90 degrees polar, which may be sufficient for many applications.

In a second and more accurate version, the analysis may include a "geometrical factor" G configured to cancel, or largely cancel, the anisotropic detection sensitivities of the detectors 101-102. The detection efficiency of each side detector 101 is generally different for sources on the interface plane 109 versus the centroid plane 119, due to the shape of each side detector 101. To correct for this anisotropy, the numerator V may be calculated as the highest counting rate of the side detectors 101, plus the geometrical factor times the second-highest side detector counting rate. Alternatively, V may be equal to the largest differential, plus G times the second-largest differential. In either case, R may then be calculated as V/D, which is then compared to the angular correlation function to obtain an estimate of the polar angle. By calculating V using the geometrical factor as described, the detector anisotropies may be largely canceled, so that R may be nearly independent of the azimuthal angle of the source. Therefore the polar angle can be determined using just a single angular correlation function, regardless of the azimuthal angle. The value of G is generally optimal in the range of 0.05 to 0.20. For the configuration of FIG. 1 with four side detectors 101, G may be optimal at 0.10 to 0.11. Artisans may adjust the value of G for their particular systems by comparing detection rates with a test source positioned on an interface plane 109 and on a centroid plane 119, using techniques well known in the field.

In a third and even more accurate version, the analysis may include two angular correlation functions, one for sources on the interface plane 109 and the other for sources on the centroid plane 119. There is no geometrical factor in this calculation. The processor 108 may be configured to first determine the azimuthal angle of the source based on the side detector 101 data as described above, and then calculate the numerator V as the sum of all the side detector 101 detection rates. D may be the central detector 102 rate as before, and R=V/D as before. The processor 108 may be configured to compare R to both of the angular correlation functions, thereby obtaining two "candidate" values of the polar angle, corresponding to the two azimuthal orientations respectively. The processor 108 can then use interpolation or weighted averaging or another formula, to combine the two candidate values according to the known azimuthal angle, thereby obtaining a true polar angle determination, with the anisotropies canceled to high order. To summarize this third version, two separate angular correlation functions are prepared for sources on the interface plane 109 and on the centroid plane 119 respectively. Then the processor 108 is configured to acquire data, calculate the azimuthal angle according to the side detector 101 data, calculate a ratio by dividing the sum of the side detector 101 data by the central detector 102 data, provide that ratio to both of the angular correlation functions, thereby obtaining two candidate values, and interpolate between those candidate values according to the known azimuthal angle, thereby determining the polar angle of the source.

Artisans can prepare the two angular correlation functions using simulation or experimentation, or more preferably both. For example, the angular correlation functions can be determined by modeling the system with a simulation program such as MCNP or GEANT, or the angular correlation functions can be measured by placing a test source around a prototype device at the two azimuthal angles of the interface and centroid planes 109-119 respectively. These techniques are well known in the field.

The device may be rotatable or stationary. In some applications, it is sufficient to localize the source by calculating the azimuthal and polar angles, report the result, and then the task is done. In other applications, the device is to be aimed directly at the source, in which case the device can acquire data, calculate the angles, and then be rotated according to the source angles so determined. As a further option, a final data set may be acquired after the rotation, for example to verify the rotation or for a final adjustment of the source location. In addition, the processor 108 may be configured to check if all the side detectors 101 have the same counting rate (within expected statistical uncertainties), and if so, to determine that the device is already aimed at the source and no further rotations are necessary.

In some embodiments, the detectors 101-102 may comprise any type of detector material that can detect the particles. For example, the detectors 101-102 may comprise scintillators, or material that emits light when impacted or traversed or partially traversed by a charged particle. Suitable scintillators include organic scintillators such as stilbene and polyvinyltoluene "PVT" scintillators, inorganic scintillators such as BGO, NaI, CsI, and elpasolites, gaseous scintillators such as natural-abundance helium or xenon, among many other scintillating materials. Each scintillator may be optically coupled to a light sensor such as a photomultiplier tube or a photodiode that converts the light pulse to an electrical signal 106 which the processor 108 can receive. Alternatively, the detectors 101-102 may comprise semiconductors such as large-area reverse-biased diodes, or they may be gaseous ionization type detectors such as proportional or Geiger mode detectors. Semiconductor detectors and gaseous ionization detectors may include a sensor comprising an amplifier and other analog electronics to condition the signal 106 so that the processor 108 can analyze it.

Each side detector 101 may have a sufficient radial thickness to block a fraction (the "blocking fraction") of orthogonally incident particles. The blocking fraction may be sufficient to provide contrast between the side detectors 101. In an application wherein the particles are expected to arrive from the front, or with small (<30 degrees) polar angles, a small blocking fraction of about 10% to 30% may be sufficient because each particle would likely encounter a tangentially longer flight path through each side detector 101, typically several times its radial thickness due to the small polar angle. If, however, the particles are expected to arrive omnidirectionally, a thicker side detector 101 may be needed, for example with a blocking fraction of about 40% to 60% in some embodiments. If particles are expected to arrive mainly from the midplane, at polar angles of about 90 degrees, then a higher blocking fraction of 70% to 90% may be necessary to obtain good contrast.

Figure 2:
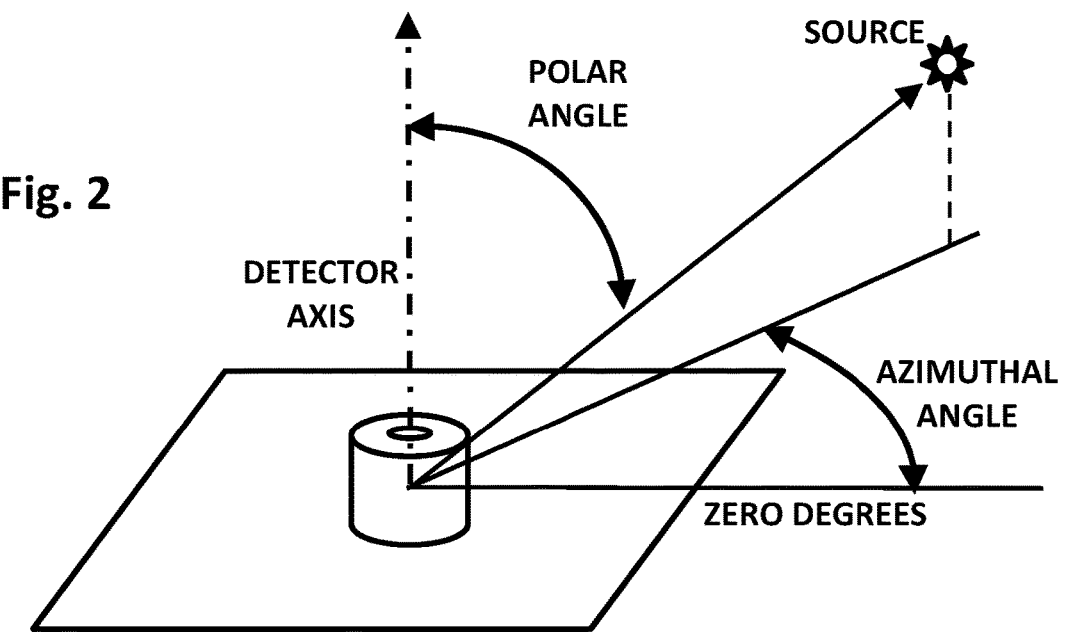
FIG. 2 is a schematic showing in perspective the angles of a spherical coordinate system centered on the device and aligned with the detector axis.

FIG. 2 is a schematic sketch in perspective showing how the azimuthal and polar angles are related to the source location. In a spherical coordinate system aligned with the detector axis, the polar angle of the source is the overall angular separation between the source and the detector axis as shown. The azimuthal angle is the angle of a vector pointing from the device to the source, projected onto a plane orthogonal to the detector axis. The polar angle ranges from zero on the frontward detector axis, to 90 degrees at the midplane of the device, to 180 degrees on the rearward detector axis. The azimuthal angle ranges from zero to 360 degrees relative to an arbitrary starting angle such as the horizontal right side, or other starting point. Thus the azimuthal angle shows in what direction the device should be rotated to bring it more closely aligned with the source, but does not specify how far to rotate the device. The polar angle specifies how far the device should be rotated, but not in what direction. Together, the polar and azimuthal angles fully specify the two-dimensional direction of the source relative to the device.

Figure 3A:
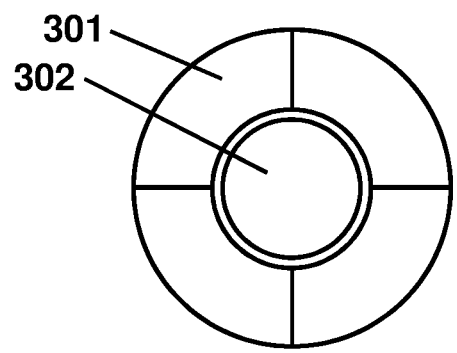
FIG. 3A is a transverse cross-section sketch of an exemplary device in a round configuration, according to some embodiments.

FIG. 3A is a transverse (perpendicular to the detector axis) cross-section sketch of an exemplary cylindrical device such as that of FIG. 1. Four arcuate side detectors 301 substantially surround the central detector 302. This configuration may be compact and light weight with high detection efficiency, and well-suited to applications with cylindrical constraints.

Figure 3B:
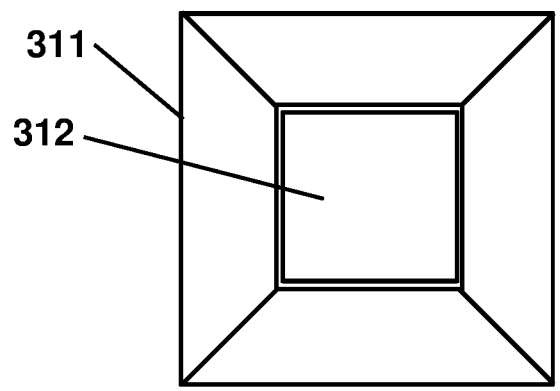
FIG. 3B is a transverse cross-section sketch of an exemplary device in a square configuration, according to some embodiments.

FIG. 3B is a transverse cross-section sketch of an exemplary device with four trapezoidal shaped side detectors 311 and a square shaped central detector 312. Such flat side detectors 311 may be easier to make than arcuate shapes.

Figure 3C:
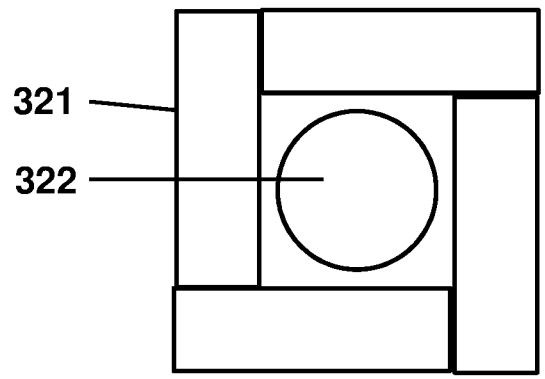
FIG. 3C is a transverse cross-section sketch of an exemplary device in a mixed configuration, according to some embodiments.

FIG. 3C is a transverse cross-section sketch of an exemplary device with four rectangular slab-shaped side detectors 321 and a round central detector 322. Rectangular side detectors 321 without edge bevels may be easier to make than trapezoidal shapes.

Figure 3D:
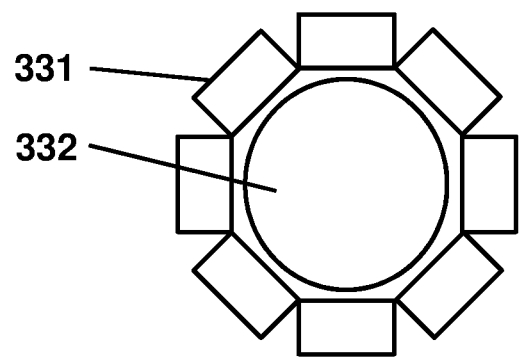
FIG. 3D is a transverse cross-section sketch of an exemplary device in an octagonal configuration, according to some embodiments.

FIG. 3D is a transverse cross-section sketch of an exemplary device with eight rectangular slab-shaped side detectors 331 and a large round central detector 332. The larger number of side detectors 331 may provide additional angular resolution for determining the azimuthal angle. As an alternative, the side detectors 331 may be made trapezoidal so that they fit together more closely.

Figure 4A:
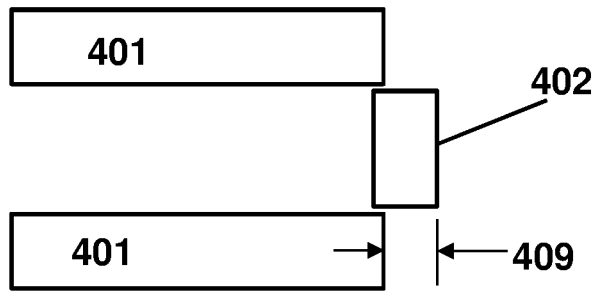
FIG. 4A is a longitudinal cross-section sketch of an exemplary device with a protruding central detector, according to some embodiments.

FIG. 4A is a longitudinal (parallel to the detector axis) cross-section sketch of an exemplary device with side detectors 401 and a central detector 402. The central detector 402 is frontwardly protruding from the side detectors 401 by a protrusion distance 409, which is the distance from the front surface of the central detector 402 to the front surface of the side detectors 401. The protrusion of the central detector 402 may improve the polar angle resolution in at least two ways. First, the protruding central detector 402 may block particles that arrive from oblique angles, thereby preventing them from striking the downstream side detector 401. Second, the protrusion 409 may enhance the detection efficiency of the central detector 402 for particles that arrive at high polar angles such as 80-90 degrees, due to the exposed portion of the central detector 402. The protrusion 409 may thereby sharpen the angular determination and/or tailor the angular correlation function that is used to calculate the polar angle from the detection data. In some embodiments, the protrusion distance may be less than the thickness of the central detector 402, so that at least a portion of the central detector 402 may remain within the array of side detectors 401 as shown. In other embodiments, the protrusion distance 409 may be greater than the thickness of the central detector 402, so that the central detector 402 may be positioned frontward beyond the side detectors 401.

Figure 4B:
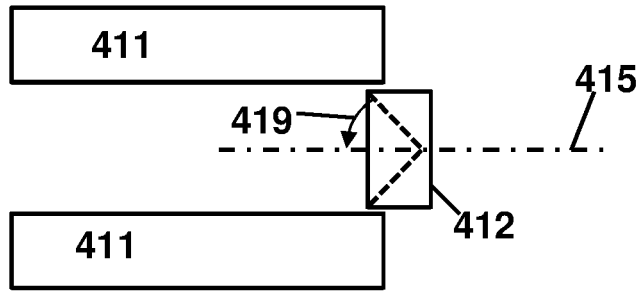
FIG. 4B is a longitudinal cross-section sketch of an exemplary device with a conical indentation in the back surface of the central detector, according to some embodiments.

FIG. 4B is a longitudinal cross-section sketch of an exemplary device with side detectors 411 and a central detector 412. The protruding central detector 412 includes a concave conical indentation or cavity on its back surface, with a cone angle 419 as indicated relative to the detector axis 415. When so shaped, the central detector 412 may have a detection sensitivity that depends on the polar angle and may thereby improve the linearity of the angular correlation function with which the polar angle is calculated.

Figure 4C:
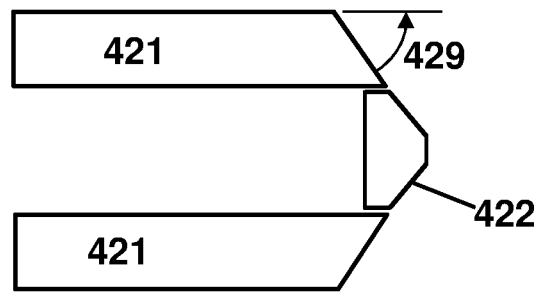
FIG. 4C is a longitudinal cross-section sketch of an exemplary device with a beveled central detector, according to some embodiments.

FIG. 4C is a longitudinal cross-section sketch of an exemplary device with side detectors 421 and a central detector 422. The front surfaces of the side detectors 421 are beveled at a bevel angle 429 relative to the back-to-front direction or the detector axis. Most of the front surface of the central detector 422 is also beveled by, in this case, the same angle 429. In some embodiments, the bevel angle may be in the range of 30 to 60 degrees.

Figure 4D:
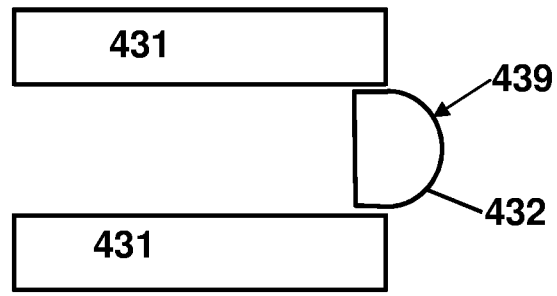
FIG. 4D is a longitudinal cross-section sketch of an exemplary device with a lens-shaped central detector, according to some embodiments.

FIG. 4D is a longitudinal cross-section sketch of an exemplary device with side detectors 431 and a central detector 432. The front surface of the front detector 432 is shaped as a lens, such as a portion of a sphere of radius 439, or other convex shape. Thus the depicted central detector 432 resembles a plano-convex lens shape, partially protruding. The rounded shape of the central detector 432 serves to block any particles that arrive at oblique angles, thereby preventing them from striking the downstream side detector 431, but only at the highest polar angles.

Figure 4E:
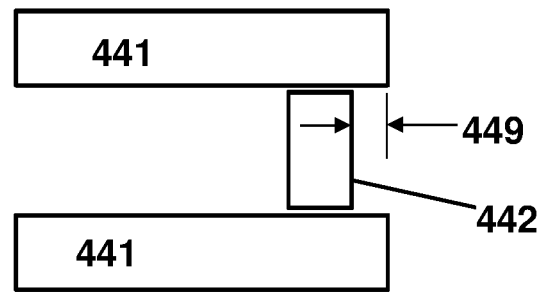
FIG. 4E is a longitudinal cross-section sketch of an exemplary device with a recessed central detector, according to some embodiments.

FIG. 4E is a longitudinal cross-section sketch of an exemplary device with side detectors 441 and a central detector 442. The central detector 442 is recessed into the side detector 441 array by a recess distance 449. When so recessed, the side detectors 441 may prevent particles with high polar angles from reaching the central detector 442, thereby sharpening the polar angular resolution. In some embodiments, the recess distance 449 may be related to the lateral dimension of the central detector 442, such as one-half or one-quarter of the lateral dimension for example, depending on the collimation effect desired.

Figure 4F:
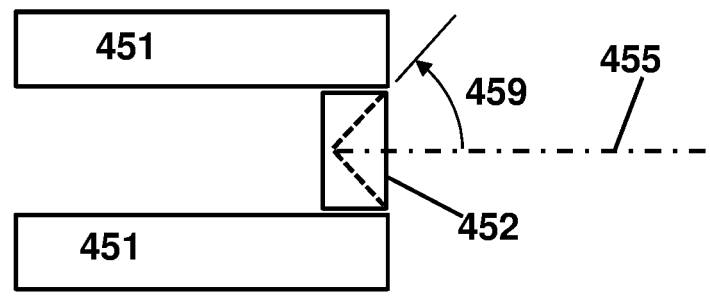
FIG. 4F is a longitudinal cross-section sketch of an exemplary device with a conical front indentation central detector, according to some embodiments.

FIG. 4F is a longitudinal cross-section sketch of an exemplary device with side detectors 451 and a central detector 452. The central detector 452 includes a conical indentation or cavity on its frontward surface at a cone angle 459. In some embodiments, the cone angle 459 may be 30 to 60 degrees relative to the detector axis 455.

Figure 4G:
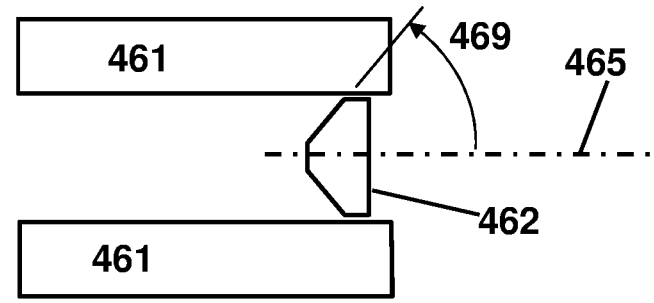
FIG. 4G is a longitudinal cross-section sketch of an exemplary device with a recessed beveled central detector, according to some embodiments.

FIG. 4G is a longitudinal cross-section sketch of an exemplary device with side detectors 461 and a central detector 462. The central detector 462 includes a convex conical bevel on its rearward surface at a bevel angle 469. In some embodiments, the bevel angle 469 may be 30 to 60 degrees relative to the detector axis 465. When so configured, the shaped central detector 462 may have a particular polar-angle-dependent detection efficiency, and thereby provide an improved angular correlation function for the determination of the polar angle.

Figure 4H:
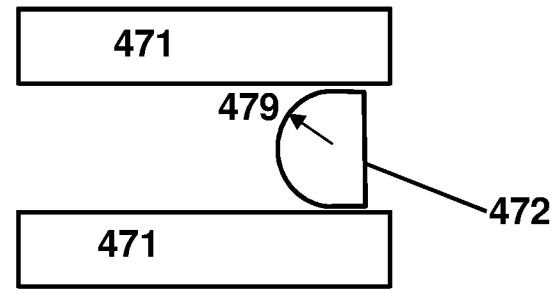
FIG. 4H is a longitudinal cross-section sketch of an exemplary device with a recessed lens-shaped central detector, according to some embodiments.

FIG. 4H is a longitudinal cross-section sketch of an exemplary device with side detectors 471 and a central detector 472. The central detector 472 includes a convex spherical or lens-shaped back surface with a radius 479 which may provide an improved angular correlation function in some embodiments.

Figure 5A:
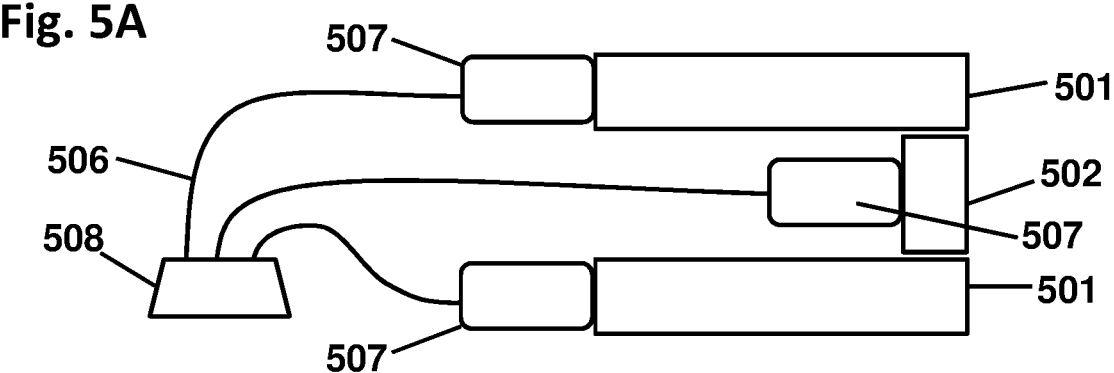
FIG. 5A is a longitudinal cross-section sketch of an exemplary device with sensors providing signals to a processor, according to some embodiments.

FIG. 5A is a longitudinal cross-section sketch of an exemplary device with side detectors 501 and a central detector 502. Sensors 507 are coupled to each detector 501-502 respectively, sending signals 506 to a processor 508. For example, the detectors 501-502 may be scintillators, and the sensors 507 may be phototubes, with or without light guides and with or without local signal amplifiers included.

Figure 5B:
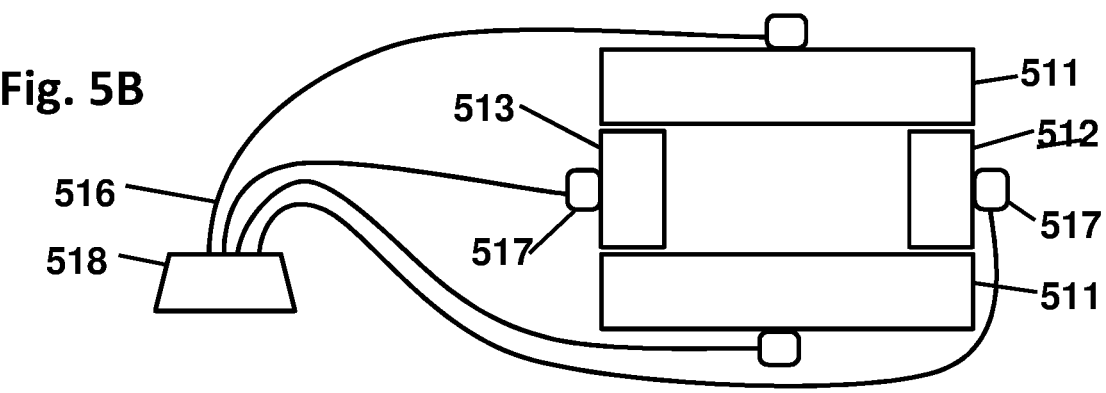
FIG. 5B is a longitudinal cross-section sketch of an exemplary device with a back detector and external sensors providing signals to a processor, according to some embodiments.

FIG. 5B is a longitudinal cross-section sketch of an exemplary device with side detectors 511, a central detector 512, a back detector 513, and sensors 517 which are coupled to each detector 511-513, respectively, and are sending signals 516 to a processor 518. The back detector 513 may be configured to detect the particles and to have the same composition and shape as the central detector 512. The back detector 513 may be recessed or alternatively protruding rearward, relative to the back surface of the side detectors 511, by the same amount that the central detector 512 is recessed or protruding relative to the front surface of the side detectors 511. The back detector 513 may be positioned closer to the back than the front of the device, and positioned at least partially within the side detector array. The device with symmetrically positioned central and back detectors 512-513 may thereby provide source localization all around the device, encompassing the entire $4\pi$ spherical solid angle around the device.

In some embodiments, the side detectors 511 may be beveled on their front and back surfaces, and the central and back detectors 512-513 may be beveled at the same bevel angle, thereby forming a symmetrical assembly with omni-directional sensitivity to arriving particles and with an angular correlation function tailored to the specific application.

The sensors 517 are shown coupled to an exterior surface of each detector 511-513. The sensors 517 are preferably as small as possible to minimize absorption of particles, while still performing their sensing function. For scintillators, the sensors 517 may be photodiodes, and for semiconductor or gaseous discharge detectors, the sensors 517 may be amplifier/shaper circuits.

Figure 5C:
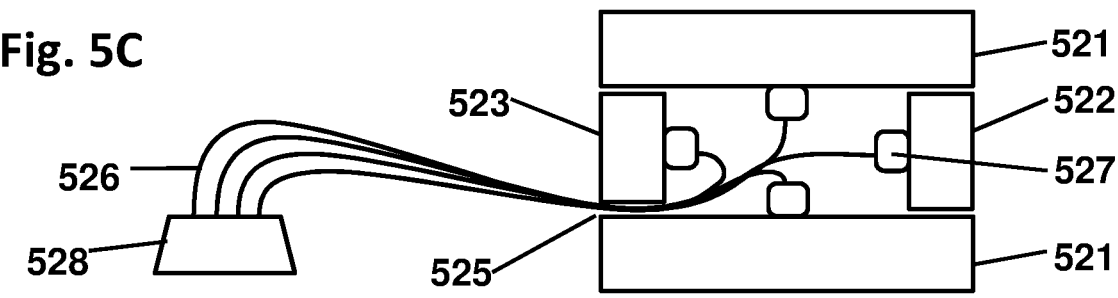
FIG. 5C is a longitudinal cross-section sketch of an exemplary device with internal sensors providing signals to a processor, according to some embodiments.

FIG. 5C is a longitudinal cross-section sketch of an exemplary device with side detectors 521 and a central detector 522, a back detector 523, and sensors 527 coupled to each detector 521-523, respectively, with the sensors 527 sending signals 526 to a processor 528. The sensors 527 are shown in the interior space inside of the side detector 521 array and between the central and back detectors 522-523. Placing the sensors 527 inside the interior space avoids blocking incoming particles. Preferably such interior-mounted sensors 527 are small in size and low in power consumption, such as photodiode sensors for scintillators, or amplifier/shapers for semiconductor or gaseous ionization detectors. A small gap 525 may be provided between one of the side detectors 521 and, in this case, the back detector 523, through which cables carrying the signals 526 can pass. DC electrical power may be provided to the sensors 527 along the same cables.

Figure 5D:
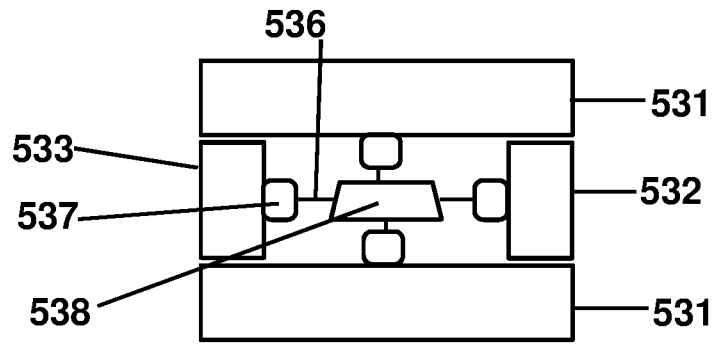
FIG. 5D is a longitudinal cross-section sketch of an exemplary device with a processor mounted inside the side detector array, according to some embodiments.

FIG. 5D is a longitudinal cross-section sketch of an exemplary device with side detectors 531 and a central detector 532, a back detector 533, and sensors 537 coupled to each detector 531-533, respectively, so as to send signals 536 to a processor 538. The sensors 537 are shown in the interior space inside of the side detector 531 array and between the central and back detectors 532-533. The processor 518 may also be mounted inside the enclosed space, thereby minimizing cables while avoiding placing material in the way of particles, and also avoiding the need for a gap. The interior-mounted processor 538 may include a battery (such as an inductively-rechargeable battery) and a transmitter (such as a WiFi or Bluetooth transmitter), so that the recharging can be done inductively, and the results can be communicated out wirelessly.

Figure 6A:
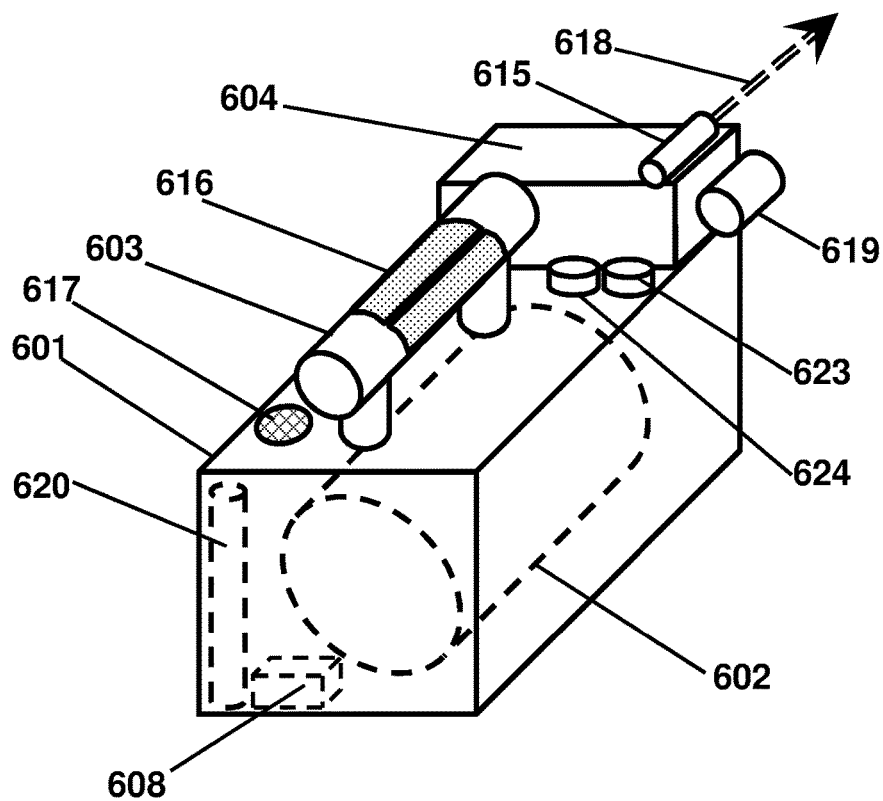
FIG. 6A is a perspective sketch of an exemplary device configured as a portable survey meter, according to some embodiments.

FIG. 6A is a perspective sketch of an exemplary hand-held survey meter 601 incorporating the directional detector device 602 including a handle 603 and a display 604. Data (such as image data or detection data or source angle results) may be stored on-board in the processor 608 or transmitted wirelessly by a communicator 620 to another location for analysis and archiving. The survey meter 601 may be further equipped with an electronic compass 623 and/or an accelerometer 624 to indicate the absolute orientation of the device 602. When so equipped, the meter 601 may correlate data acquired at multiple measurements and at different detector orientations, and thereby apply interpolation, triangulation, weighted averaging and the like to rapidly localize the source.

The survey meter 601 may further include multiple haptic panels 616 built into the handle 603. The haptic panels 616 may be activated according to the source angles, such as the horizontal and vertical angles of the source relative to the current orientation of the meter 601. The haptic panels 616 can thereby haptically indicate the source direction, relative to the current meter 601 orientation, to the operator. In addition, the haptic panels 616 can also indicate when the device 602 is aimed directly at the source, for example by pulsing with a characteristic code. The haptic panels 616 can also alert the operator if the local radiation level becomes dangerously high.

The embodiment may also include a small speaker 617 that emits a tone or warble that indicates, for example, when the detector axis is substantially aligned with the source. Alternatively, the speaker 617 may indicate the direction of the source by various tonal modulations. In addition, the speaker 617 may be configured to emit computer-generated speech based on the source angles, such as: "Source is 35 degrees above and to the right of your current aim . . . . 20 degrees . . . 6 degrees . . . zero degrees! Source is now localized!"

The survey meter 601 may further include a camera 619 to record the inspection scene in video or still photos. The camera 619 may be activated manually by the operator, or automatically upon each azimuthal angle determination, or when the meter becomes aligned with the source. Alternatively, the camera 619 may be rotatable so as to aim at the calculated source direction, thereby placing the suspected source in the center of the image. To do so, the camera 619 itself may be rotatable according to the azimuthal and polar angles of the source, or the camera 619 may include an adjustable mirror or other optical element that shifts the viewpoint toward the calculated source location. In addition, the camera 619 may include a zoom lens and may be configured to successively magnify the image as the calculated uncertainty in the source location is improved. Alternatively, the camera 619 may be configured to apply graphical information such as an overlay onto on the image, for example an ellipse or other icon representing the uncertainties in the azimuthal and polar angles of the source. The icon may be configured to indicate the type of source or the type of particle detected. Alternatively, that information may be added as text to the periphery of the image for example.

The survey meter 601 may further include a light beam transmitter 615 such as a laser pointer that emits a light beam 618. In some embodiments, the light beam 618 may be aimed parallel to the detector axis, thereby visually indicating the current aim point. In other embodiments, the light beam 618 may be redirected according to the azimuthal and polar angles of the source, thereby bathing the suspected source location with a spot of light. This may greatly assist inspectors in recognizing and localizing hidden sources among obfuscation and clutter.

Figure 6B:
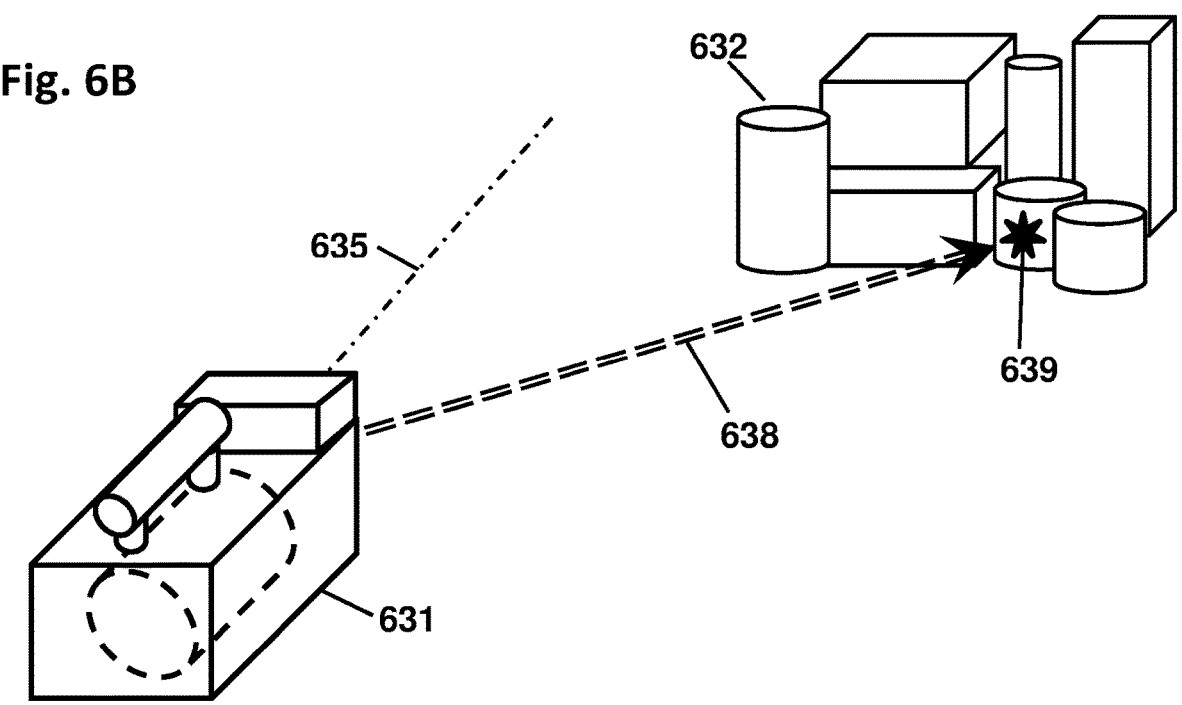
FIG. 6B is a perspective sketch of an exemplary device configured as a portable survey meter detecting a threat, according to some embodiments.

FIG. 6B is a perspective sketch of an exemplary survey meter 631 inspecting cargo 632. A threat source 639 is concealed among the cargo 632. The meter 631 has detected the source 639 and determined the angles toward its location relative to the current detector axis 635. The meter 631 has emitted a light beam 638 directed toward the location of the source 639, thereby illuminating the source location and helping an inspector to quickly determine which part of the cargo 632 contains the source 639.

As the meter 631 is moved around and rotated during the inspection process, the light beam 638 may be continually readjusted accordingly, thereby causing the light beam 638 to continually dwell upon the source 639 location. For example, the light beam 638 may be redirected according to changes in orientation of the meter 631. The meter 631 orientation may be determined in real-time by the compass and accelerometer 623-624 of FIG. 6A, for example. After adjusting for changes in orientation of the meter 631, or at any time, the beam direction may be adjusted according to further particle detection data. The additional data may be acquired in real-time at each successive orientation of the meter 631. By keeping the light beam 638 apparently "locked on" to the source 639 location, the meter 631 may further assist inspectors in locating the source 639 quickly.

Figure 6C:
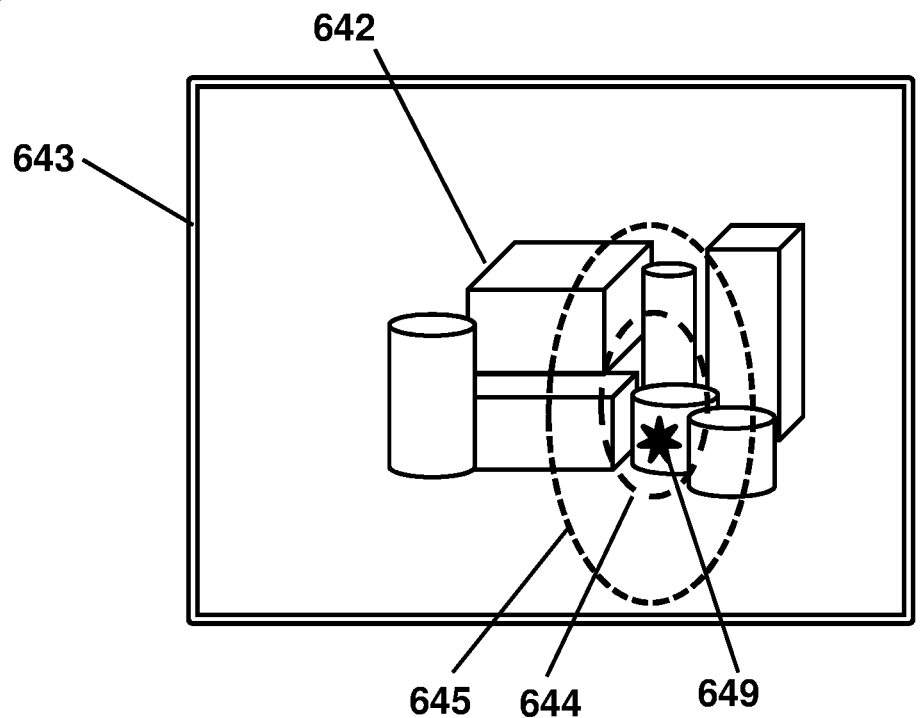
FIG. 6C is a sketch of an exemplary photograph indicating the location of a threat and uncertainty contours, according to some embodiments.

FIG. 6C is a schematic sketch of an exemplary image 643 such as that acquired by the camera 619 of FIG. 6A, including cargo 642 hiding a source 649. In the depicted embodiment, the source 649 is not centered in the image 643. Rather, the calculated source location is indicated by a series of elliptical overlays 644-645 positioned on the image 643 according to the calculated azimuthal and polar angles. In addition, the size and shape of the overlays 644-645 may be related to the uncertainties of the azimuthal and polar angle determinations, thereby showing the operator the range of locations where the source 649 is most likely to be found. For example, the dashed ellipse 644 may correspond to an uncertainty contour such as the one-sigma uncertainty contour, and the dotted ellipse 645 may be the two-sigma contour based on the number of counts in each detector for example. The contours 644-645 are shown elliptical, not circular, for a case in which the azimuthal angle has a larger uncertainty than the polar angle, due for example to the central detector having a higher counting rate than the side detectors, and that difference is responsible for the difference in angular uncertainties.

Figure 6D:
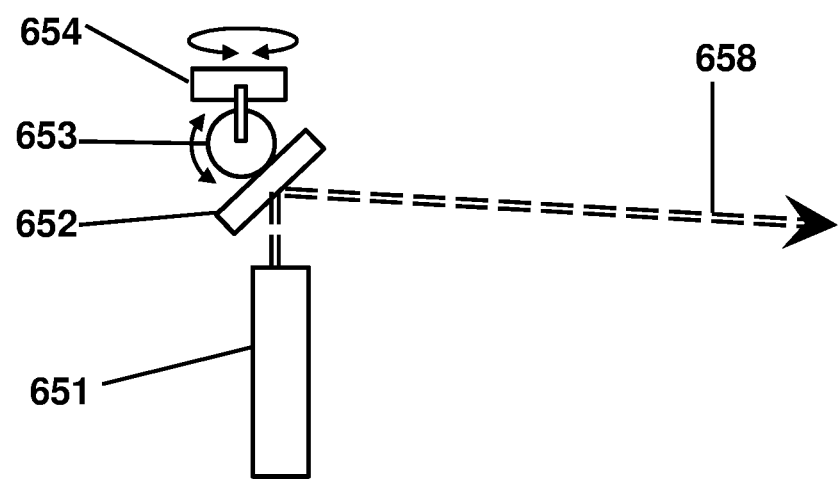
FIG. 6D is a schematic of an exemplary mechanism to redirect a light beam toward a source location, according to some embodiments.

FIG. 6D is a sketch showing an exemplary embodiment of a mechanism for redirecting the light beam 658 toward a source direction. A laser 651 or other light transmitter emits a light beam 658 which reflects from a mirror 652 which is mounted on a hinge or roller 653 which is suspended from a turntable 654. Component motions are indicated by arrows. The hinge or roller 653 may be adjusted to redirect the light beam 658 according to the vertical angle of the source location, while the turntable 654 may be adjusted to cause the light beam 658 to have the correct horizontal angle, thereby illuminating the source with light.

In some embodiments, the direction of the light beam 658 may be controlled by pulsing the light transmitter 651. For example, the roller 653 and the turntable 654 may be in continuous motion or near-continuous oscillatory or stepped or rastering motion across a broad region of space. The light transmitter 651 may then be activated only when the roller 653 and turntable 654 are in the correct position to redirect the light beam 658 toward the source, and the light transmitter 651 is held off at all other times. Thus the position of the light beam spot on the source position is controlled by the timing of the light beam transmitter 651 according to the instantaneous positions of the roller 653 and turntable 654 so as to illuminate the source location only. In other embodiments, the roller 653 and turntable 654 may be operated to draw a figure with the light beam 658 directly, in a manner such as vector graphics for example.

Optionally, the light beam 658 shape may be rendered as a circle or an ellipse or cross-hairs or other shape centered on the calculated source location. In some embodiments, the shape of the light beam 658 may be configured to indicate the uncertainties in the horizontal and vertical position determinations as related to the uncertainties in the azimuthal and polar angles, and/or other information such as the type of particle detected or the radiation intensity observed.

Figure 7A:
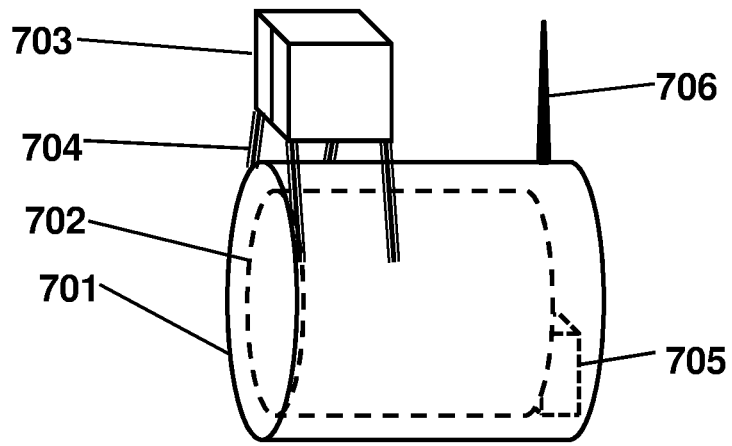
FIG. 7A is a perspective sketch of an exemplary device configured as a detachable scanner, according to some embodiments.

FIG. 7A is a perspective sketch of an exemplary embodiment of the present device 702 enclosed in a weather-proof case 701. A switchable magnetic clamp 703, such as the type used by machinists to temporarily hold ferromagnetic parts, is attached by struts 704 to the case 701. In other embodiments, the system may include 2 or 3 or 4 or more magnetic clamps, so as to provide a more robust attachment to a steel wall despite jostling. A battery 705 and a transmitter 706 are included. The depicted system may be useful for inspecting large steel enclosures such as shipping containers at a shipping port. Typically, the entry inspection at a shipping port is a brief scan, lasting a mere 30 to 60 seconds in most cases. A well-shielded nuclear source may not be detectable in such a short interval. However, containers are typically stacked and stored in the port yard for periods of up to few days. To obtain a deeper inspection during that waiting period, the system depicted may be mounted onto the side of the shipping container using the magnetic clamp 703, and may continuously accumulate particle data for as long as necessary. For an even deeper scan, the device 701 may be mounted on a container throughout its 10-day ocean journey, thereby accumulating a very sensitive inspection. The battery 705 enables the system to operate without having to drag extension cords around the busy port yard or crowded transit vessel. The wireless transmitter 706 allows the data, including source location data, to be transmitted to the authorities.

Figure 7B:
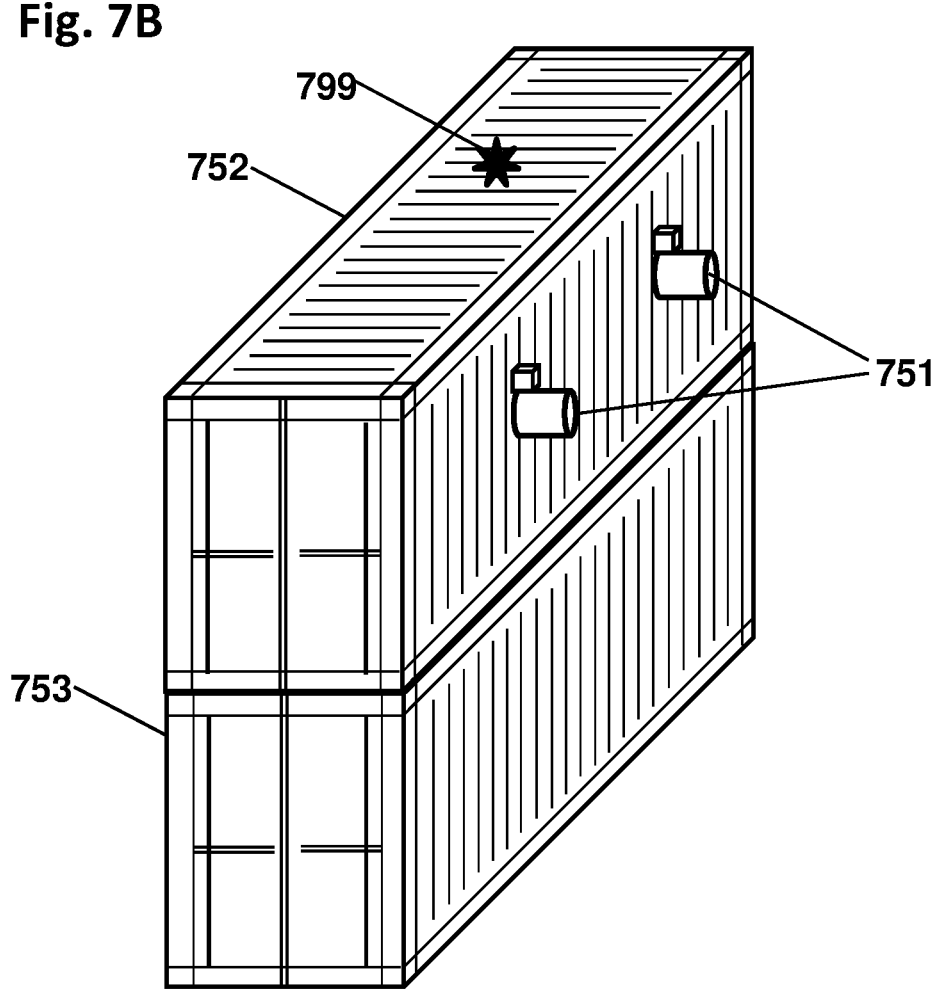
FIG. 7B is a perspective sketch of an exemplary device configured as a detachable scanner mounted on a shipping container, according to some embodiments.

FIG. 7B is a perspective sketch of a shipping container 752 that contains a clandestine source 799, stacked on a benign container 753. Two detachable detection systems 751 such as that of FIG. 7A are magnetically clamped to the side of the suspect container 752, autonomously collecting radiation data for an extended period of time. Each of the systems 751 may be configured to detect the source 799 and to calculate the direction of the source 799 relative to each system 751. Then, combining the data from the two systems 751, the source position in three dimensions can be determined. Since the systems 751 can continue collecting radiation data for an extended period, and since they can correlate and compare their results, they may be capable of detecting and localizing sources that are smaller or more well-shielded than could be detected during the brief entry scan.

Figure 8:
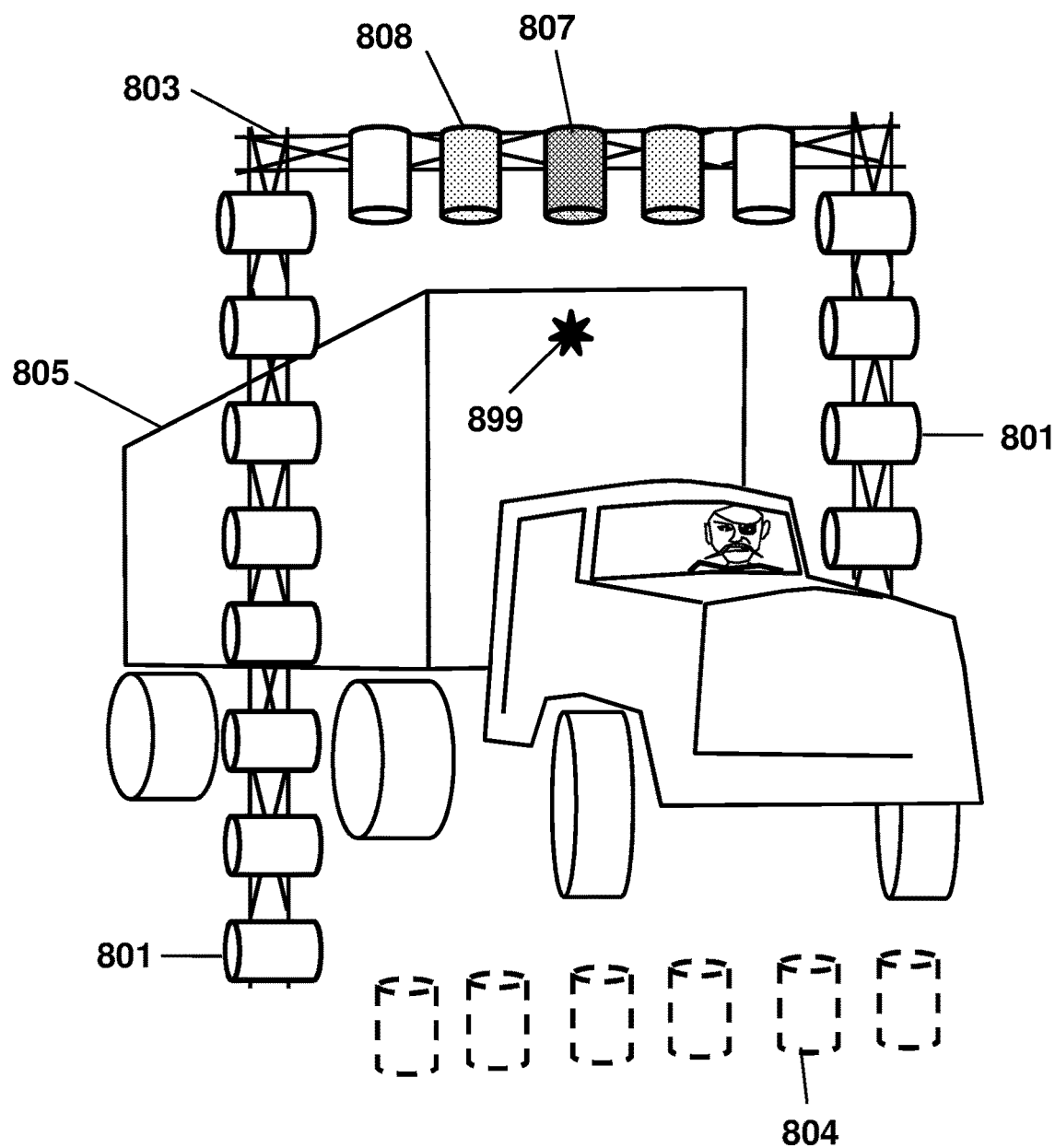
FIG. 8 is a perspective sketch of an exemplary device configured as a vehicle scanner, according to some embodiments.

FIG. 8 is a perspective sketch showing a truck 805 being inspected by an array of the present devices 801 mounted on a scaffold 803 as well as further devices 804 mounted under the pavement. An adversary has hidden a shielded nuclear pit 899 near the roof of the truck 805, and has arranged shielding under and around the pit 899 to prevent detection by conventional post-mounted detectors. Little did he know that the inspection station would include directional detection devices 801, spaced apart and mounted overhead as well as on the sides and below. Accordingly, one of the overhead devices 807 (dark stipple) has detected and localized the nuclear pit 899, and several other directional devices 808 (light stipple) have picked up smaller signals, thereby clearly revealing the threat. In addition, a processor such as a facility computer can analyze data from all the devices 801-804 to localize the source 899.

Figure 9A:
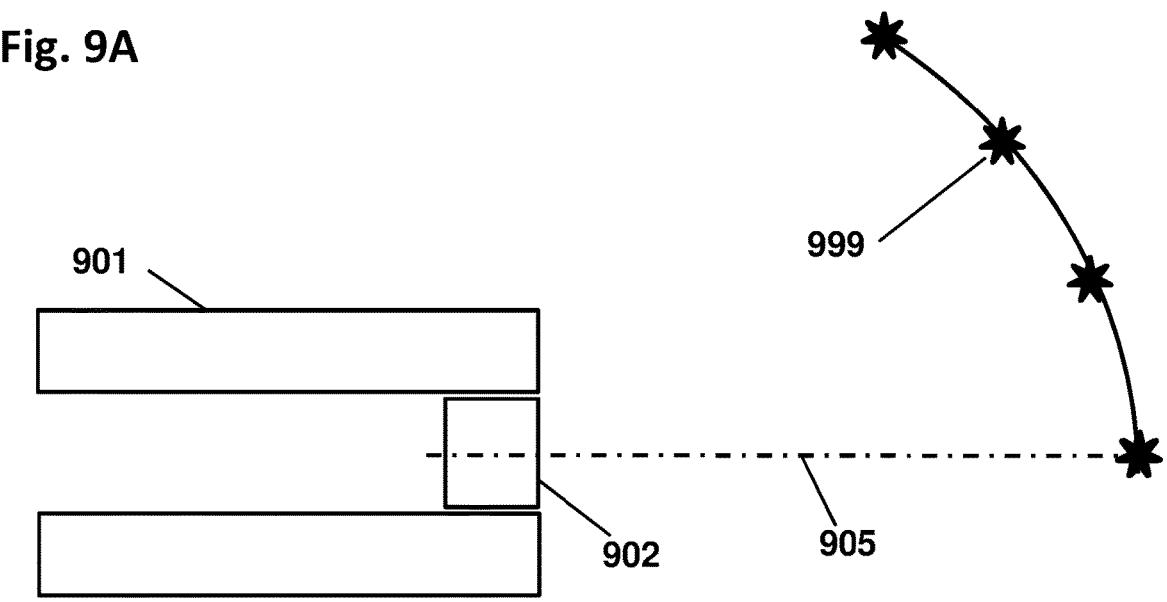
FIG. 9A is a longitudinal cross-section sketch of an exemplary device as used in an MCNP high-energy neutron simulation, according to some embodiments.

FIG. 9A is a sketch showing a setup for an MCNP6 simulation to test the performance of an exemplary device configured to detect 1 MeV neutrons. The simulated device included side detectors 901 and a central detector 902. A simulated 1 MeV neutron source 999 was placed at various polar angles relative to the detector axis 905, and the detection rates in the detectors 901-902 were determined. The side detectors 901 in the simulation were PMMA plus 0.1% $^{10}$B in ZnS, 60 cm long and 40 cm in diameter, while the central detector 902 comprised the same material, 30 cm in diameter and 5 cm thick. The central detector 902 was flush in this case, the front surface of the central detector 902 being coplanar with the front surface of the side detectors 901. The detection criterion was an alpha particle generated within any detector 901-902. Simulated detection data were taken with the source 999 initially at an azimuthal angle of zero degrees while the polar angle was varied from zero to 90 degrees in 10 degree increments. The source distance was 10 meters.

Figure 9B:
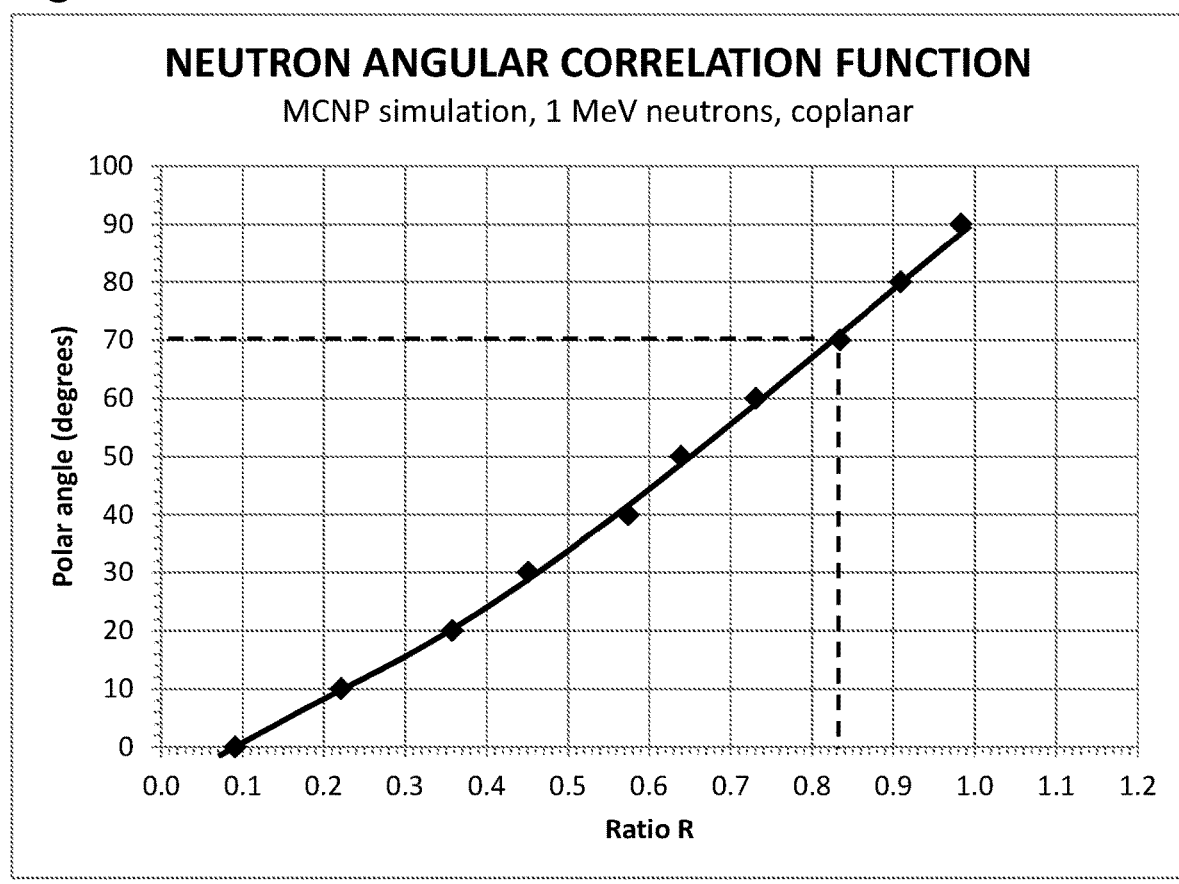
FIG. 9B is a chart showing MCNP simulation results for the configuration of FIG. 9A.

FIG. 9B is a graph showing results of the simulation of FIG. 9A. The curve shown is the angular correlation function that relates the polar angle of the source 999 to the detection data. Specifically, the ratio R (horizontal axis) was calculated by first calculating differentials for all four side detectors 901, then calculating a value V by adding the largest differential to G times the second-largest differential, with G=0.1, and then dividing by the detection rate in the central detector 902. Optionally, the square root of the ratio may be calculated. The resulting curve, as shown, is a monotonic, near-linear, deterministic correlation function that relates the polar angle to the ratio R. For example, a particular ratio of R=0.835 corresponds to a polar angle of 70 degrees, as indicated by dashed lines. Additional cases were run at different azimuthal angles such as 45 degrees, with statistically the same results. Therefore the polar angle of the source can be determined by calculating R as specified, and using the angular correlation function of FIG. 9B to find the corresponding source angle.

In some embodiments, the processor may be configured to calculate the polar angle of the source using two separate angular correlation functions, corresponding to two "calibration" azimuthal angles, respectively. For example, a first calibration azimuthal angle may coincide with the centroid of one of the side detectors 901, and the second calibration azimuthal angle may coincide with the interface between two of the side detectors 901. In that case the geometrical factor G is not involved. Instead, the two angular correlation functions are first determined, using a test source or with a simulation program for example, by placing the source (or simulated source) at each of the two calibration azimuthal angles in turn, and measuring the detection rates in each detector 901-902. In operation, the processor can acquire data, calculate the source azimuthal angle from the side detector 901 data, and then calculate a ratio involving the central and side detectors 901-902. For example, the ratio may equal the sum of the side detectors 901 divided by the central detector 902 rate, or other equivalent formula that includes the side and central detector 901-902 detection data. The processor can then provide the ratio to each of the angular correlation functions, thereby obtaining two candidate values for the source polar angle, each candidate value corresponding to the two candidate azimuthal angles respectively. Then, the processor can average or interpolate or otherwise combine the two candidate values according to the calculated azimuthal angle of the source, thereby deriving a value of the source polar angle which is valid at all azimuthal angles, and with the detector anisotropies canceled to high order.

Figure 10A:
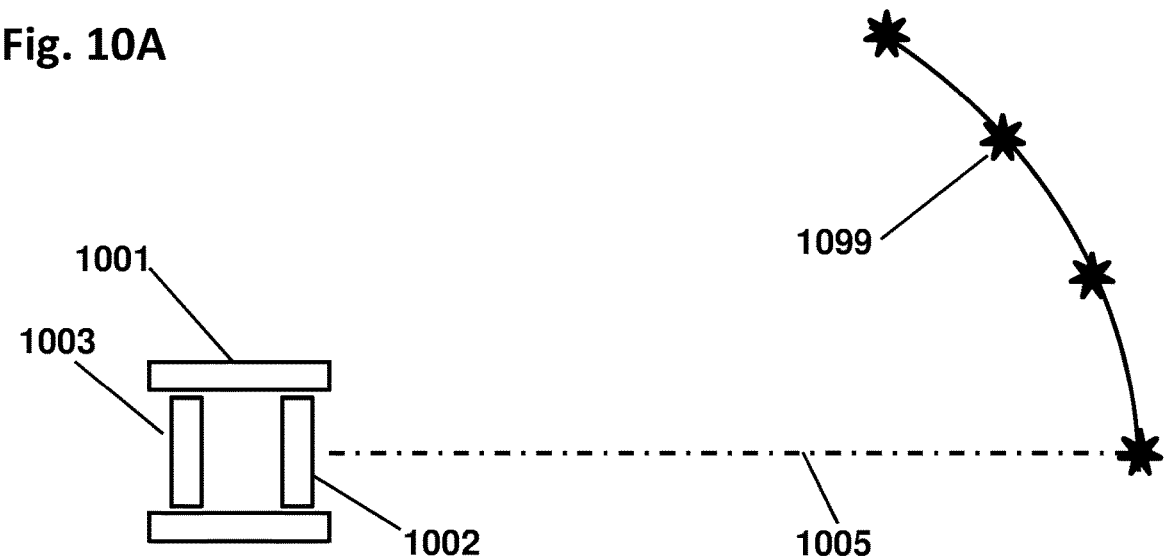
FIG. 10A is a longitudinal cross-section sketch of an exemplary device as used in an MCNP low-energy neutron simulation, according to some embodiments.

FIG. 10A is a sketch showing a setup for a second MCNP6 simulation, this time using low-energy "thermal" neutrons (E=0.025 eV). The simulated side detectors 1001, the central detector 1002, and the back detector 1003 were PMMA with 0.1% $^{10}$B in ZnS. The detection criterion was again any alpha particle in any detector. The side detectors 1001 were 20 cm long, 16 cm in diameter, and 1 cm thick. The central and back detectors 1002-1003 were 1 cm thick and 14 cm in diameter, recessed by 1 cm relative to the side detector array 1001, respectively. The polar angle of a source 1099 was varied relative to the detector axis 1005 with a source distance of 3 meters.

Figure 10B:
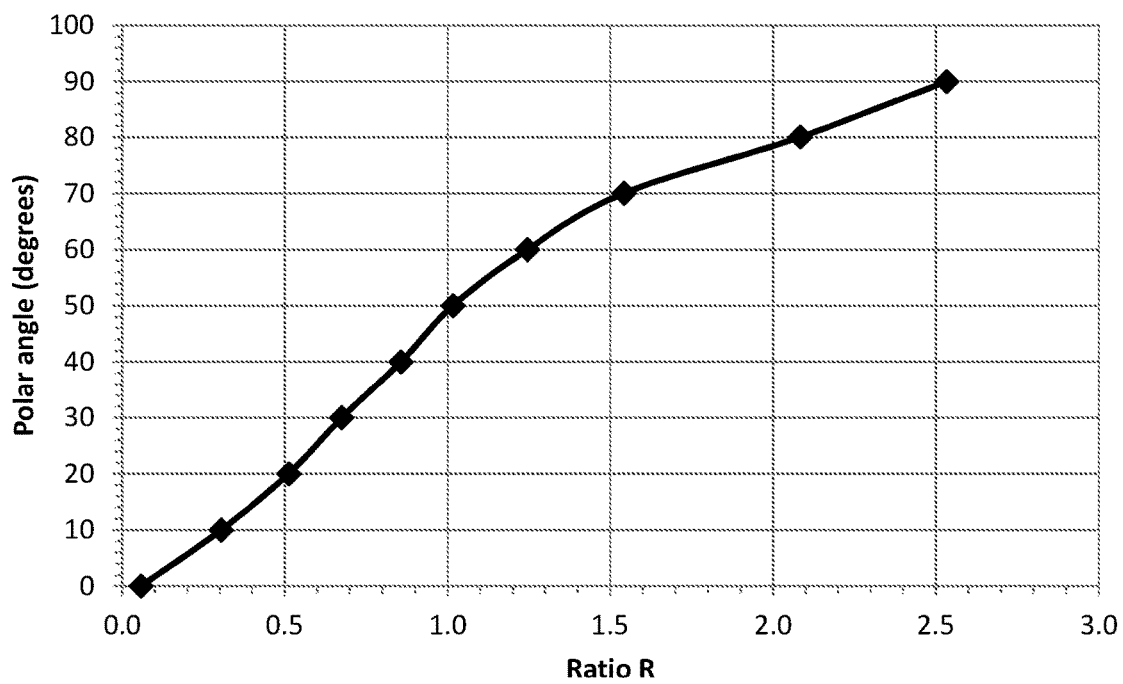
FIG. 10B is a chart showing MCNP simulation results for the configuration of FIG. 10A.

FIG. 10B is a chart showing the results of the simulation of FIG. 10A. The ratio R was calculated as before using the geometrical factor. Again, a clearly monotonic angular correlation function was obtained, showing how the polar angle of the source 1099 depends on the detection rates.

Figure 11A:
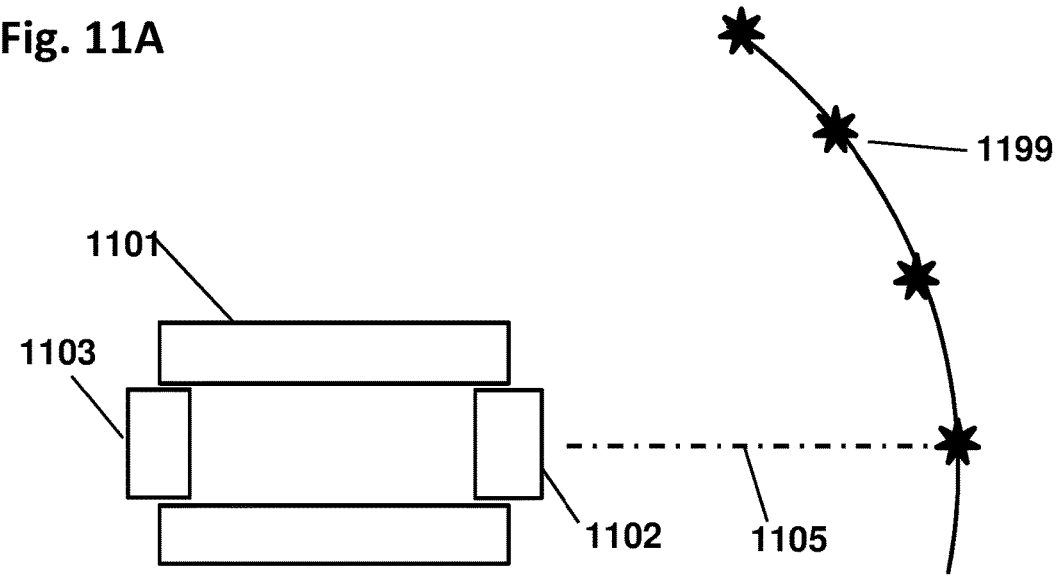
FIG. 11A is a longitudinal cross-section sketch of an exemplary device as used in an MCNP gamma ray simulation, according to some embodiments.

FIG. 11A is a sketch showing a setup for a third MCNP simulation, using 1 MeV gamma rays. The simulated device comprised side detectors 1101 comprising BGO scintillator, 8 cm in diameter, 1 cm wall thickness, and 10 cm long. The central and back detectors 1102-1103 were BGO, 1.5 cm thick, 6 cm in diameter. The central and back detectors 1102-1103 were protruding from the side detector array 1101 by 1 cm. The source distance was 10 meters. Source locations 1199 were tested at polar angles of 0-90 degrees relative to the detector axis 1105. The detection criterion was set at 10% of the gamma energy, or 100 keV.

Figure 11B:
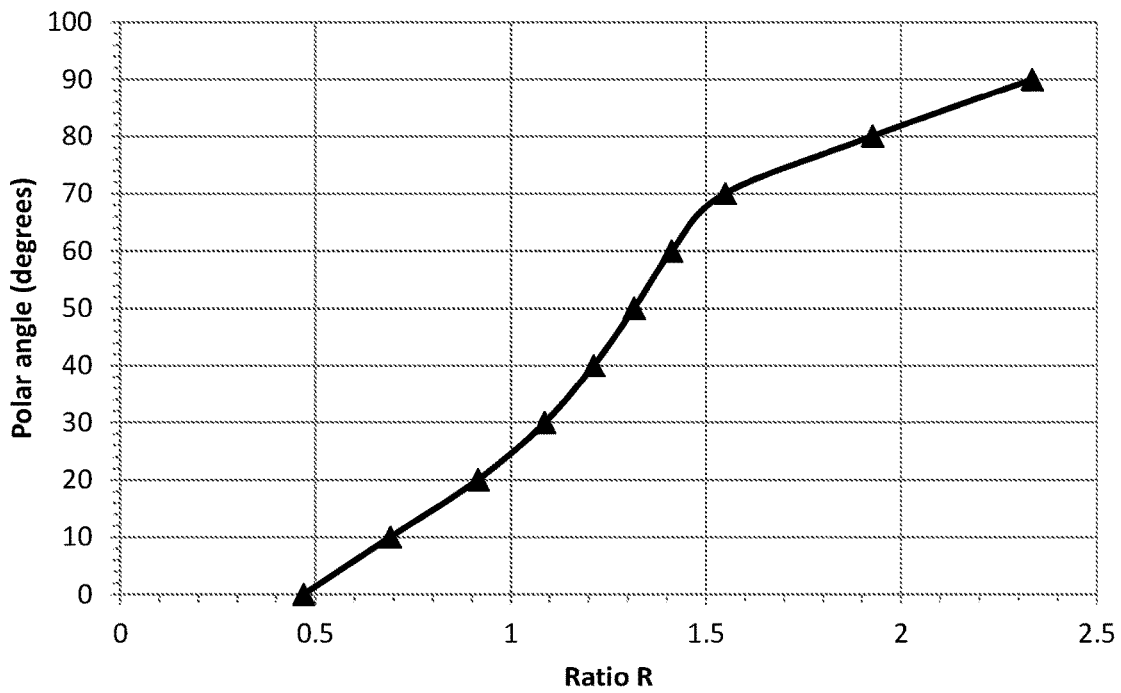
FIG. 11B is a chart showing MCNP simulation results for the configuration of FIG. 11A.

FIG. 11B is a chart showing the results of the simulation of FIG. 11A. Again a monotonic correlation was achieved relating the polar angle to the detection rates. These and many other simulations conducted at different angles and detector configurations demonstrate that (1) embodiments of the device disclosed herein can detect and localize gamma rays, thermal neutrons, and fast neutrons using suitable detector materials, and (2) the shape and features of the angular correlation function can be varied by adjusting the position (recessed, coplanar, protruding) of the central detector and the other detector dimensions. Artisans can prepare an appropriate angular correlation function for their designs by running a simulation as described, or by moving a test source around their device, as is well known in the particle detection field.

Figure 12:
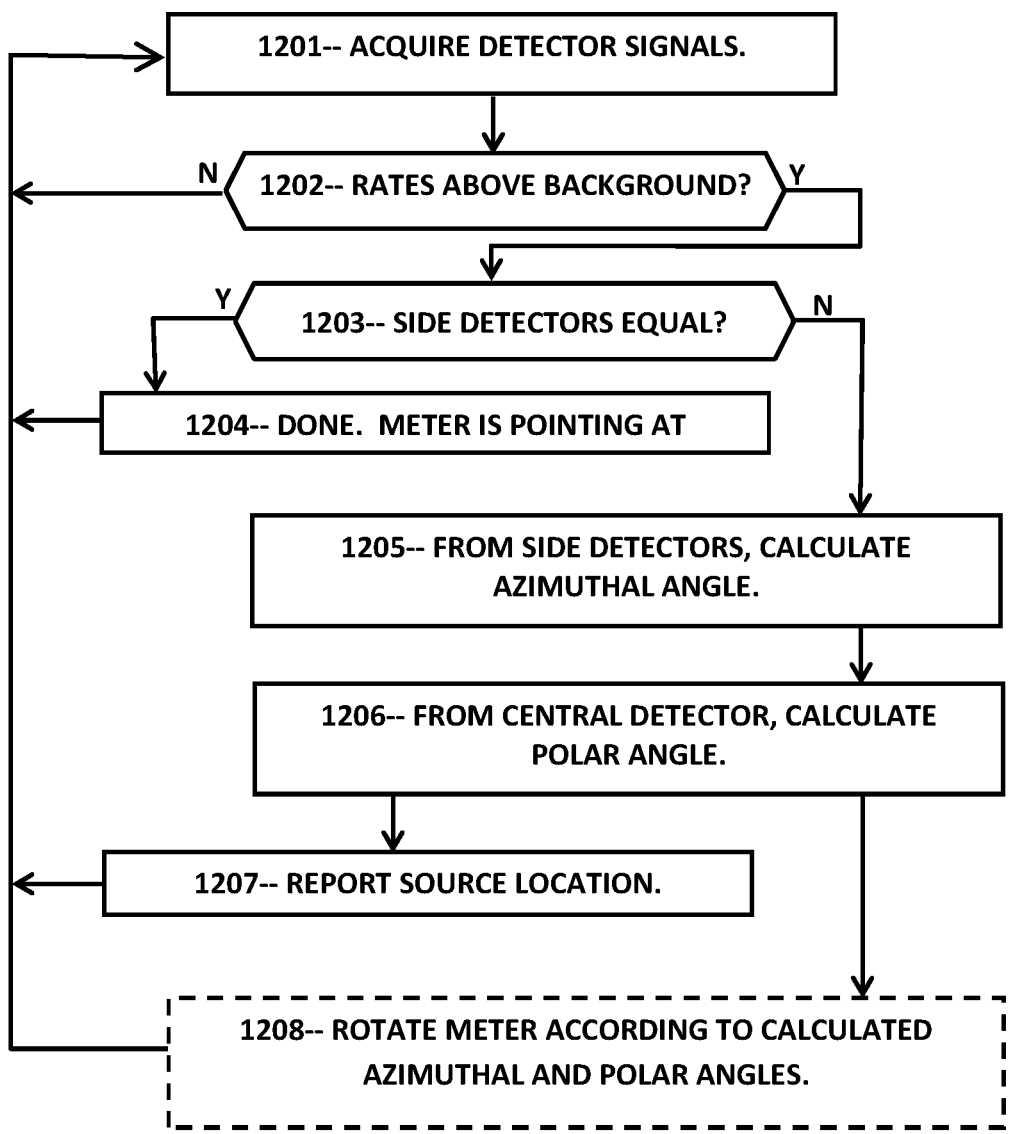
FIG. 12 is a flowchart showing steps of an exemplary method to calculate the source angles, according to some embodiments.

FIG. 12 is a flowchart showing steps of an exemplary method for calculating the azimuthal and polar angles from the detector signals. First (1201) the various detector signals may be acquired, for example by counting the number of times that each detector signal exceeds a voltage or discrimination threshold during an integration time. Additional constraints may also be applied to each signal such as risetime or pulse shape or other signal processing requirements. Veto requirements, or logic-based rejections, may also be applied, such as rejecting any event in which more than one detector fires at once. Then (1202) the detector rates may be compared to a predetermined background level for each detector to determine whether a detectable source is present. Alternatively, for greater sensitivity, the sum of all the detector rates may be compared to a total expected background rate. If the detection rate significantly exceeds the expected background rate (for example, exceeding the background rate by more than the expected statistical uncertainty), then a source is present and is detectable; and if not, the flow returns to step 1201. When a source is present, the side detector rates may be checked to determine if they are all equal, or are all equal to within expected statistical uncertainties (1203), which would indicate that the device is already aimed at the source. Alternatively, the side detector differentials may be calculated and checked if they are all zero within statistical uncertainties. If so, then the device is currently aimed at the source, and the source is thereby localized, and the task is done (1204).

If the side detector rates are not equal, or are not sufficiently similar according to uncertainties, then (1205) the azimuthal angle of the source may be calculated by, for example, interpolating between the two side detectors with the highest counting rates or the highest differentials. Then (1206) the polar angle may be calculated by, for example, calculating a ratio R equal to a function of the side detector rates divided by the central detector rate, and then determining the polar angle by comparing R to a predetermined angular correlation function. The source location, or direction, or azimuthal and polar angles, can then the be reported (1207). Reporting may comprise transmitting the results to another system, or displaying the results using, for example, a directional icon on a flat-screen display, or directing a light beam toward the source, or recording the data locally or remotely, or otherwise reporting the results.

Optionally (1208, in dash) the meter may be rotated according to the calculated azimuthal and polar angles so as to point directly at the source location. Additional data may be acquired at that orientation. The final data set may be used to verify the source alignment, or to quantify the small remaining polar angle for example. The method thus allows an inspector to rapidly localize an initially unknown radioactive source.

Figure 13:
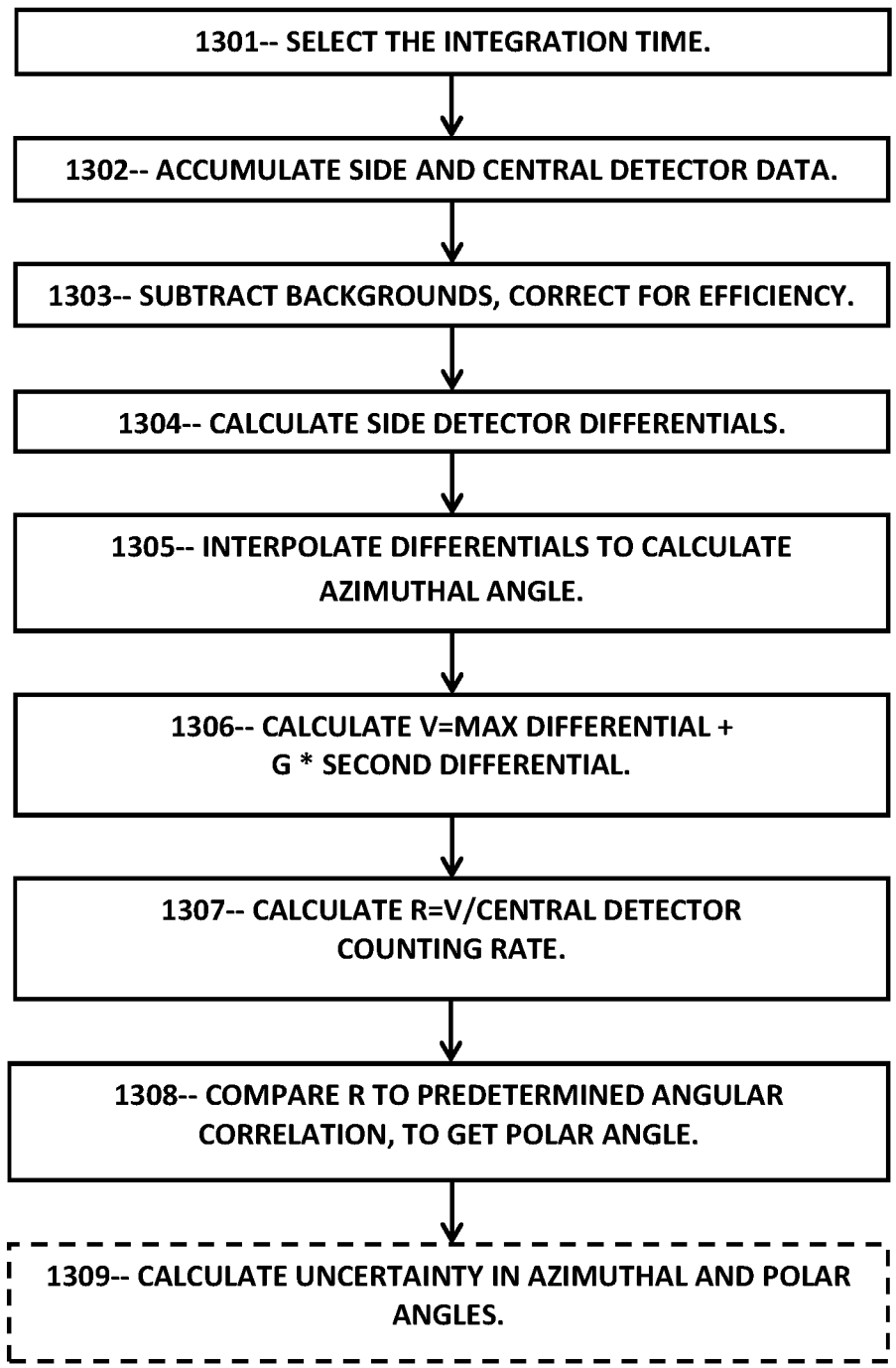
FIG. 13 is a more detailed flowchart showing steps of an exemplary method to calculate the source angles, according to some embodiments.

FIG. 13 is a flowchart showing further details of a method for localizing a radioactive source. First (1301) an integration time may be selected, determining how long the signals are to be acquired before calculating the source direction. The integration time may be set by the inspector or by the processor for example. In a high radiation environment, a brief acquisition is typically sufficient to detect and localize the source, whereas a small or well-shielded source may require a much longer acquisition interval to detect the remaining radiation above normal backgrounds. Then (1302) the detection data for the side and central detectors may be accumulated for the selected integration time. The acquisition may comprise, for example, counting the number of signals emitted by each detector above a predetermined threshold during that time. Then, optionally, the raw data may be corrected (1303) for different detection efficiencies of each detector, and/or for the different background levels of each detector, which may be different due to variations in gain or dark noise or other variations for example. Also, unwanted events such as cosmic rays may be subtracted at this time, or electronically during the previous acquisition step. The data may then be analyzed (1304) by, for example, calculating differentials for each side detector by subtracting from each side detector rate the opposite side detector rate.

The azimuthal angle may then be calculated (1305) by, for example, interpolating among the side detector rates or the corresponding differentials. Then (1306) a value V may be calculated by, for example, calculating the maximum side detector differential plus a geometrical factor G times the second-highest differential, where G is configured to correct the small difference in side detector efficiencies at zero and 45 degrees azimuthal angle. Alternatively, V may be calculated according to the maximum side detector rate plus G times the second-highest side detector rate.

Then (1307) the ratio R may be calculated as the ratio of V to the central detector rate. R may then be compared (1308) to a predetermined angular correlation function which then provides, as output, an estimate of the polar angle of the source. Optionally (1309) the uncertainties in the azimuthal and polar angles may then be calculated using, for example, the expected statistical uncertainties in the raw counting data.

Figure 14:
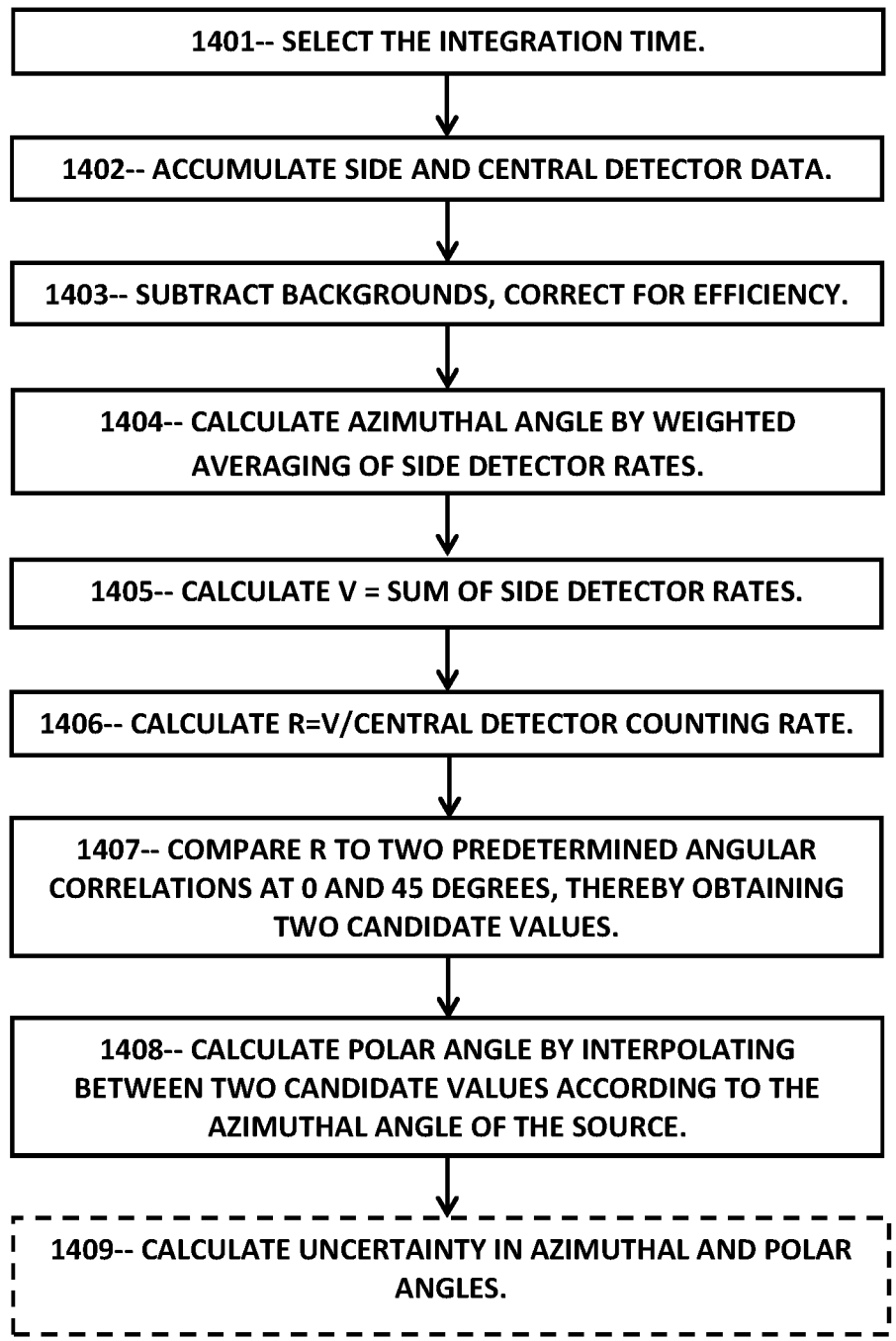
FIG. 14 is a flowchart showing steps of an exemplary method to calculate the polar angle using two angular correlation functions, according to some embodiments.

FIG. 14 is a flowchart showing an alternative method for localizing a radioactive source. First (1401) an integration time may be selected as before and (1402) the detection data for the side and central detectors may be accumulated for the selected integration time, and optionally the raw data may be corrected (1403) for different detection efficiencies of each detector and backgrounds. The azimuthal angle may then be calculated (1404) by, for example, weighted averaging among the side detector rates or the corresponding differentials. Then (1405) a value V may be calculated by, for example, adding all of the side detector rates. Then (1406) the ratio R may be calculated as the ratio of V to the central detector rate. R may then be compared (1407) to two different angular correlation functions, in which each of the angular correlation functions corresponds to a different azimuthal angle, such as zero and 45 degrees respectively (or other two angles corresponding to an interface and a centroid of the side detector array respectively). Then, using the ratio R derived from the detector rates, the two angular correlation functions may provide two candidate values, which may then be interpolated (1408) or otherwise combined according to the azimuthal angle from step 1404. The resulting interpolated polar angle of the source may thereby have high precision with detector anisotropies cancelled to high order, according to some embodiments. In addition, optionally (1409), the uncertainties in the azimuthal and polar angles may then be calculated. For example, the expected statistical uncertainties in the raw counting data may be used to calculate the uncertainties in the azimuthal and polar angles of the source.

A directional detector device according to the disclosure can offer numerous advantages in detecting and localizing clandestine nuclear weapons, as well as any other radioactive source that is to be located. The device is enabling, in applications such as cargo inspection, walk-through portals, portable survey meters, mobile scanners searching for unexpected radiation in an urban environment, and many other critical applications. According to some embodiments: (a) on a single acquisition period at a single orientation, the device can determine the azimuthal and polar angles of the source without rotations or iteration; (b) by comparing the total detection rates in all the detectors, the device can provide high sensitivity to even a well-shielded source at practical distances; (c) embodiments can determine when the device is directly aligned with the source to high precision, by comparing the opposing side detectors; (d) the device can provide high detection efficiency due to the absence of collimators or other barriers; (e) the device may be low in weight due to its hollow design as well as the lack of shielding; (f) the device is easy to build, easy to use, and requires no exotic/rare/expensive materials; (g) the device can raise an alarm as soon as multiple particles are detected from the same region of an inspection object, thereby thwarting any attempt to obscure a threat with shielding and obfuscation; (h) embodiments of the device are compact, self-contained, rugged, reliable, and cheap.

Advanced radiation detection systems, like those disclosed herein, will be needed in the coming decades to protect innocent people from the threat of nuclear and radiological terrorism.

The embodiments and examples provided herein illustrate the principles of the invention and its practical application, thereby enabling one of ordinary skill in the art to best utilize the invention. Many other variations and modifications and other uses will become apparent to those skilled in the art, without departing from the scope of the invention, which is to be defined by the appended claims.

What is claimed is:

1. A device for locating a radioactive source, comprising:
a side detector array comprising at least four side detectors configured to emit a signal upon detecting a particle from the radioactive source, wherein the side detectors are arranged around a detector axis that extends from the back to the front of the device, thereby forming a hollow assembly;
a central detector, configured to emit a signal upon detecting a particle from the radioactive source, centered on the detector axis and recessed within the side detector array; and
a processor configured to receive the signals from the side detectors and the central detector, calculate the azimuthal angle of the radioactive source, and calculate the polar angle of the radioactive source;
wherein the side detectors have a blocking fraction of at least 30%.

2. The device of claim 1, wherein the back surface of the central detector is shaped as a concave conical surface.

3. The device of claim 1, wherein the front surface of each side detector is beveled relative to the detector axis.

4. The device of claim 1, wherein at least a portion of the front surface of the central detector is beveled relative to the detector axis.

5. The device of claim 1, wherein the front surface of the central detector comprises a portion of a sphere.

6. The device of claim 1, wherein the back surface of the central detector comprises a portion of a sphere.

7. The device of claim 1, further comprising a back detector configured to emit a signal upon detecting a particle from the radioactive source, and positioned closer to the back than the front of the device.

8. The device of claim 7, wherein the central detector and the back detector are both recessed within the side detector array by the same amount.

9. The device of claim 7, wherein the processor is enclosed in a volume bounded by the side detectors, the central detector, and the back detector.

10. The device of claim 7, further comprising a gap between the back detector and at least one of the side detectors, wherein at least one of the signals passes through the gap.

11. The device of claim 1, wherein the device further includes a handle and a display, the device being configured to indicate a direction toward the radioactive source.

12. The device of claim 1, further comprising a light beam transmitter configured to direct a light beam in a calculated direction.

13. The device of claim 12, wherein the light beam transmitter is further configured to indicate the uncertainty in the location of the radioactive source.

14. The device of claim 1, further comprising a magnetic clamp configured to removably attach the device to a ferromagnetic surface.

15. The device of claim 1, wherein the device is one of a plurality of directional radiation detectors, and wherein a computer is configured to determine the location of the radioactive source by combining directional data from each of the plurality of directional radiation detectors.

16. The device of claim 1, wherein the particles are in the list of gamma rays, low-energy neutrons, and high-energy neutrons.

17. The device of claim 1, wherein the side detectors are in the list of scintillation detectors, semiconductor detectors, and gaseous ionization detectors.

18. The device of claim 1, wherein the processor includes non-transient computer-readable media containing instructions for a method comprising:
- acquiring detection data from the side detectors and the central detector respectively;
- calculating the azimuthal angle of the radioactive source according to detection data of the side detectors; and
- calculating the polar angle of the radioactive source according to detection data of the central detector.

19. The device of claim 18, wherein the method further includes:
- obtaining two candidate values by comparing the ratio to two different angular correlation functions that correspond to two different azimuthal angles respectively; and
- determining the polar angle of the radioactive source by combining the two candidate values according to the azimuthal angle of the radioactive source.

* * * * *